(12) United States Patent
Baughn et al.

(10) Patent No.: US 7,870,014 B2
(45) Date of Patent: Jan. 11, 2011

(54) PERFORMANCE MANAGEMENT SYSTEM

(75) Inventors: John B. Baughn, Seattle, WA (US); Raymond Goff, Liberty Township, OH (US); Miranda L. Mason, Denver, CO (US); Barry A. Gleichenhaus, Littleton, CO (US); Karen M. Bobear, Shaker Heights, OH (US)

(73) Assignee: Accenture Global Services GmbH, Schaffhausen (CH)

( * ) Notice: Subject to any disclaimer, the term of this patent is extended or adjusted under 35 U.S.C. 154(b) by 1233 days.

(21) Appl. No.: 10/961,765

(22) Filed: Oct. 8, 2004

(65) Prior Publication Data

US 2006/0080156 A1 Apr. 13, 2006

(51) Int. Cl.
*G06F 9/44* (2006.01)
(52) U.S. Cl. .......................................................... 705/7
(58) Field of Classification Search ........................ None
See application file for complete search history.

(56) References Cited

U.S. PATENT DOCUMENTS

| | | | |
|---|---|---|---|
| 5,983,227 A | | 11/1999 | Nazem et al. |
| 6,345,239 B1 | | 2/2002 | Bowman-Amuah |
| 6,425,525 B1 | | 7/2002 | Swaminathan et al. |
| 7,035,809 B2* | | 4/2006 | Miller et al. ..................... 705/8 |
| 7,162,427 B1* | | 1/2007 | Myrick et al. .................. 705/1 |
| 2001/0051913 A1* | | 12/2001 | Vashistha et al. .............. 705/37 |
| 2002/0072987 A1* | | 6/2002 | Knudsen et al. ............... 705/26 |
| 2002/0099582 A1* | | 7/2002 | Buckley et al. ................. 705/7 |
| 2002/0184043 A1* | 12/2002 | Lavorgna et al. ................ 705/1 |
| 2003/0110067 A1* | 6/2003 | Miller et al. ..................... 705/8 |
| 2003/0149614 A1 | 8/2003 | Andrus et al. |
| 2004/0032420 A1* | 2/2004 | Allen et al. .................. 345/700 |
| 2004/0068431 A1* | 4/2004 | Smith et al. .................... 705/10 |
| 2004/0122936 A1* | 6/2004 | Mizelle et al. ............... 709/224 |
| 2004/0143470 A1* | 7/2004 | Myrick et al. ................... 705/7 |
| 2005/0144022 A1* | 6/2005 | Evans ............................. 705/1 |
| 2005/0144592 A1* | 6/2005 | Below et al. ................. 717/124 |
| 2005/0154769 A1* | 7/2005 | Eckart et al. ................. 707/201 |
| 2005/0209944 A1* | 9/2005 | Ballow et al. ................. 705/35 |
| 2006/0004596 A1* | 1/2006 | Caniglia et al. ................ 705/1 |

OTHER PUBLICATIONS

Rubin, Howard A. Using metrics for outsourcing oversight. Information Systems Management. Spr 1997. 14:2 p. 1-11.*
Basu, Ron. New Criteria of Performance Management. Measuring Business Excellence. 2001. 5:4 pp. 7-12.*

(Continued)

*Primary Examiner*—Romain Jeanty
*Assistant Examiner*—Brett Feeney
(74) *Attorney, Agent, or Firm*—Brinks Hofer Gilson & Lione

(57) ABSTRACT

An outsourcing command center collects and processes outsourcing data for multiple engagements and multiple outsourcing offerings. The command center may apply a metric set to the outsourcing data that is broadly applicable across multiple outsourcing offerings, but also tailored to specific outsourcing offerings, and extended by engagements to meet their particular metric reporting criteria. The command center provides a portal through which an engagement may access processed metric information for outsourced functions, including metric reporting screens with convenient drill-down link sets to display progressively more detailed views of metrics processed for the engagement.

25 Claims, 14 Drawing Sheets

OTHER PUBLICATIONS

Misra RB (2004). Global IT Outsourcing: Metrics for Success of All Parties. Journal of Information Technology Cases and Applications. 6(3): 21-34.*

Ryan HW, Alber MW, Taylor SJ, Change RA, Arvanitis YA, Davis MC, Mullen NK, Dove SL, Mehra PN, and Mindrum C. (1998). Netcentric Computing Computing, Communications, and Knowledge. Auerbach. pp. 1-230.*

Telecommunications Product Development Benchmarking Study Launched by Pittiglio Rabin Todd & McGrath. PR Newswire. May 2, 1996. p. 1-3.*

The prosecution history of U.S. Appl. No. 11/252,099 shown in the attached Patent Application Retrieval file wrapper document list, printed Sep. 23, 2009, including each substantive office action and applicants' response.

* cited by examiner

| Under $350,000 then Green | 302 |
|---|---|
| Between $350,000 and $500,000, then Yellow | 304 |
| Over $500,000, then Red | 306 |
| Client C  308 | SG&A Expenditures  310 |

| Client C | 902 | ITO offering | 904 | Availability | 906 |

| Over 99% uptime, then Green | 908 |
|---|---|

| Between 80% and 99% uptime, then Yellow | 910 |
|---|---|

| Under 80% uptime, then Red | 912 |
|---|---|

900

| Login 1012 | Metric Access 1014 | Engagement Access 1016 |
|---|---|---|
| Outsourcing Chief Executive | All | All |
| Outsourcing Assistant | BPO, TIO metrics | All |
| BPO Executive | BPO metrics | Engagement A, C |
| TIO Executive | TIO metrics | Engagement C |
| Client C | All | Engagement C |

| accenture > | Performance Management Portal | 1100 |
| Accenture Finance Solutions | | |

Region

Delivery Center

Engagement

Welcome
Welcome to the AFS Performance Management Portal. This website provides the latest information on the performance of the AFS business.

Your Website
This website is a single point of access for all the AFS metrics linked to corporate strategy and objectives. Presented as an online Balanced Scorecard you can view a monthly summary of performance against targets, illustrated in tabular reports, charts, and displays.

Business Intelligence
The Business Objects tool lets you view the latest performance trends across the whole AFS business, for a delivery center or a specific client. Ad-hoc queries and reports may be created and saved.

1102

| Process Excellence 1104 | Service Excellence 1108 |
| Organization Excellence 1106 | Business Value 1110 |

Balanced Scorecard 1112

Balanced Scorecard
Click on the circle above to view the Balanced Scorecard for AFS as a whole or clink on one of the quadrants to view a specific perspective.

Alternatively, use the navigation tool on the left to go straight to the balanced scorecard for the region, delivery center or engagement of your choice.

Figure 11

AFS.BalancedScorecard

Customer | Product | Quality Management | Predictive Analysis

Add to My Analytics    Refresh    Save As    Send    Customize

April 2004

Business Value

| Status | Freq | Metric | Actual | Target | Trend | Overall Actual | Overall Target |
|---|---|---|---|---|---|---|---|
| ✗ | M | Contract Margin | $45,782.0 | $150,000.0 | --- | $99,000.0 | $150,000.0 |
| ✗ | M | EVA Charges | $8,316.5 | $200,000.0 | --- | $150,000.0 | $200,000.0 |
| ✗ | M | Gross Margin | $7,270.7 | $15,000.0 | ↗ | $14,500.0 | $15,000.0 |
| ✗ | M | Revenue per FTE | $23,992.0 | $150,000.0 | --- | $101,000.0 | $150,000.0 |
| ✗ | M | Total Revenue | $561,860.0 | $1,100,000.0 | ↗ | $1,050,000.0 | $1,100,000.0 |
| ○ | M | Controllable Income | $18,398.2 | $12,000.0 | ↗ | $18,000.0 | $12,000.0 |
| ○ | M | Contract Margin % | 0.0% | 0.1% | ↗ | 0.1% | 0.1% |
| ○ | M | Controllable Income % | 0.2% | 0.3% | ↗ | 0.2% | 0.3% |
| ○ | M | Gross Margin % | 0.0% | 0.2% | ↗ | 0.1% | 0.2% |

Process Excellence

| Status | Freq | Metric | Actual | Target | Trend | Overall Actual | Overall Target |
|---|---|---|---|---|---|---|---|
| ○ | M | Overheads % of Revenue | 0.2% | 0.3% | ↗ | 0.4% | 0.3% |
| ○ | M | Payroll % of Revenue | 0.0% | 0.0% | ↗ | 0.0% | 0.0% |
| ○ | Q | Key Accounts Not Fully Reconciled % | 0.1% | 0.0% | ↗ | 0.1% | 0.0% |
| ○ | Q | Overtime % | 0.2% | 0.0% | ↗ | 0.1% | 0.0% |

Service Excellence

| Status | Freq | Metric | Actual | Target | Trend | Overall Actual | Overall Target |
|---|---|---|---|---|---|---|---|
| ○ | A | No. High Impact Exceptions & Service Issues | 923.7 | 0.0 | --- | 1,900.0 | 0.0 |
| ✗ | A | CQMA Compliance | 0.2% | 1.0% | ↗ | 1.0% | 1.0% |
| ○ | A | CQMA Client Satisfaction | 0.8% | 1.0% | --- | 1.0% | 1.0% |
| ○ | M | Customer Satisfaction | 0.8% | 1.0% | ↗ | 1.0% | 1.0% |
| ○ | M | % SLAs Met | 0.9% | 1.0% | ↗ | 1.0% | 1.0% |

Organization Excellence

| Status | Freq | Metric | Actual | Target | Trend | Overall Actual | Overall Target |
|---|---|---|---|---|---|---|---|
| ○ | M | Ave. Cost per Seat | $77,489.5 | $10,500.0 | --- | $11,000.0 | $10,500.0 |
| ✗ | M | Ave. Training Days Per FTE | $3.2 | $10.0 | ↘ | $7.0 | $10.0 |
| ○ | M | Total Headcount (FTEs) | $92.6 | $80.0 | ↗ | $121.0 | $80.0 |
| ○ | M | % Days Absence | 0.0% | 0.0% | ↗ | 0.0% | 0.0% |
| | | % Unmanaged | | | | | |

Balanced Scorecard

Figure 12

PERFORMANCE MANAGEMENT SYSTEM

BACKGROUND

1. Technical Field

This invention relates to processing systems for collecting, processing, and presenting data. In particular, this invention relates to data processing systems for collecting engagement data across multiple outsourcing offerings, applying analysis metrics to the engagement data, and presenting analysis results.

2. Background Information

Outsourcing has emerged as a widely applicable and popular procedure that businesses employ to reduce costs, increase profitability, and focus the business on its core operations. A business may outsource nearly any aspect of it operations. As a few examples, businesses may outsource human resource operations, payroll operations, and supply chain operations.

Outsourcing providers have responded to the desire to outsource business functions. For example, many outsourcing providers setup independent outsourcing centers to implement specific outsourcing offerings. Each outsourcing provider may determine and report low level business performance measures. However, in most cases, the low level measures were not useful to key business decision makers because the metrics were not directly indicative of business value or were not correlated to progress against desired business outcomes.

In addition, because so many aspects of a business may be outsourced, a single business may find their outsourced functions logically or physically distributed among multiple outsourcing centers operated by a single outsourcing provider or possibly multiple outsourcing providers. When outsourcing functions are distributed, it becomes time and cost intensive for the business to monitor not only the performance of the individual outsourcing functions, but also to gain an understanding of the performance impact on the business of its outsourced functions as a whole.

Furthermore, because a business may outsource multiple services, each group providing the outsourced services may process and report outsourcing statistics in a different manner. As a result a business may not have a consistent reference point for comparing the performance of different outsourced functions. In addition, when outsourced functions are distributed among multiple outsourcing centers, it becomes difficult even for the outsourcing provider to obtain convenient access to, and a common reference point for, all of the outsourcing offerings implemented by the outsourcing provider.

There is a need for addressing the problems noted above and other previously experienced.

BRIEF SUMMARY

An outsourcing command center collects and processes outsourcing data that may span multiple engagements and multiple outsourcing offerings. The command center may generate high level business value delivered information based on underlying low level metrics. The command center may include a metric set that is broadly applicable across multiple outsourcing offerings, tailored metric sets applicable to particular outsourcing offerings, and engagement extensions to the metrics sets. The command center provides a portal through which an engagement may access processed metric information for all of their outsourced functions, and which provides a flexible access hierarchy defining permissions to the processed metric information.

In one implementation, a data processing system implements a command center data that may include an upper tier metric set applicable to multiple outsourcing offerings. As examples, the outsourcing offerings may be a Business Process Outsourcing (BPO) offering, a Technology Infrastructure Outsourcing (TIO) offering, or an Application Outsourcing (AO) offering. The upper tier metric set may be applicable to any other outsourcing offerings.

In addition, the data processing system may store engagement extension metrics. For example, a TIO engagement extended metric set may include the upper tier metric set and a TIO engagement extension. Similarly, a BPO extended metric set may include the upper tier metric set and a BPO engagement extension.

A database in the data processing system stores engagement operations data obtained from engagement outsourcing operation sites that may be logically or physically distinct. The data processing system applies the engagement extended metric sets to the engagement operations data to generate processed metrics for each engagement outsourcing offering. Accordingly, the data processing system may generate TIO processed metrics and BPO processed metrics for the engagement.

A user interface generated by the data processing system may include a metric reporting interface. The metric reporting interface reports the processed metrics externally to the engagement or internally for review and analysis. The metric reporting interface may include a drill-down link set to present the processed metrics in increasingly detailed or increasingly specific form.

BRIEF DESCRIPTION OF THE DRAWINGS

FIG. 3 shows a reporting rule that may be established in the outsourcing command center as part of a reporting ruleset.

FIG. 10 illustrates an access hierarchy with access entries that may authorize or deny access to data in the outsourcing command center.

FIG. 11 shows a command center portal into metrics processed according to a multiple level metrics hierarchy.

FIG. 12 shows a metric reporting screen with detailed metric reporting elements for outsourcing categories shown in FIG. 11.

DETAILED DESCRIPTION

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as stored in program, data, or multipurpose system memories, all or part of systems and methods consistent with the outsourcing command center technology may be stored on or read from other machine-readable media, for example, secondary storage devices such as hard disks, floppy disks, and CD-ROMs; electromagnetic signals; or other forms of machine readable media either currently known or later developed.

Furthermore, although this specification describes specific components of a command center data processing system, methods, systems, and articles of manufacture consistent with the command center technology may include additional or different components. For example, a processor may be implemented as a microprocessor, microcontroller, application specific integrated circuit (ASIC), discrete logic, or a combination of other types of circuits acting as explained above. Databases, tables, and other data structures may be separately stored and managed, incorporated into a single memory or database, or generally logically and physically organized in many different ways. The programs discussed below may be parts of a single program, separate programs, or distributed across several memories and processors.

Figure 1:
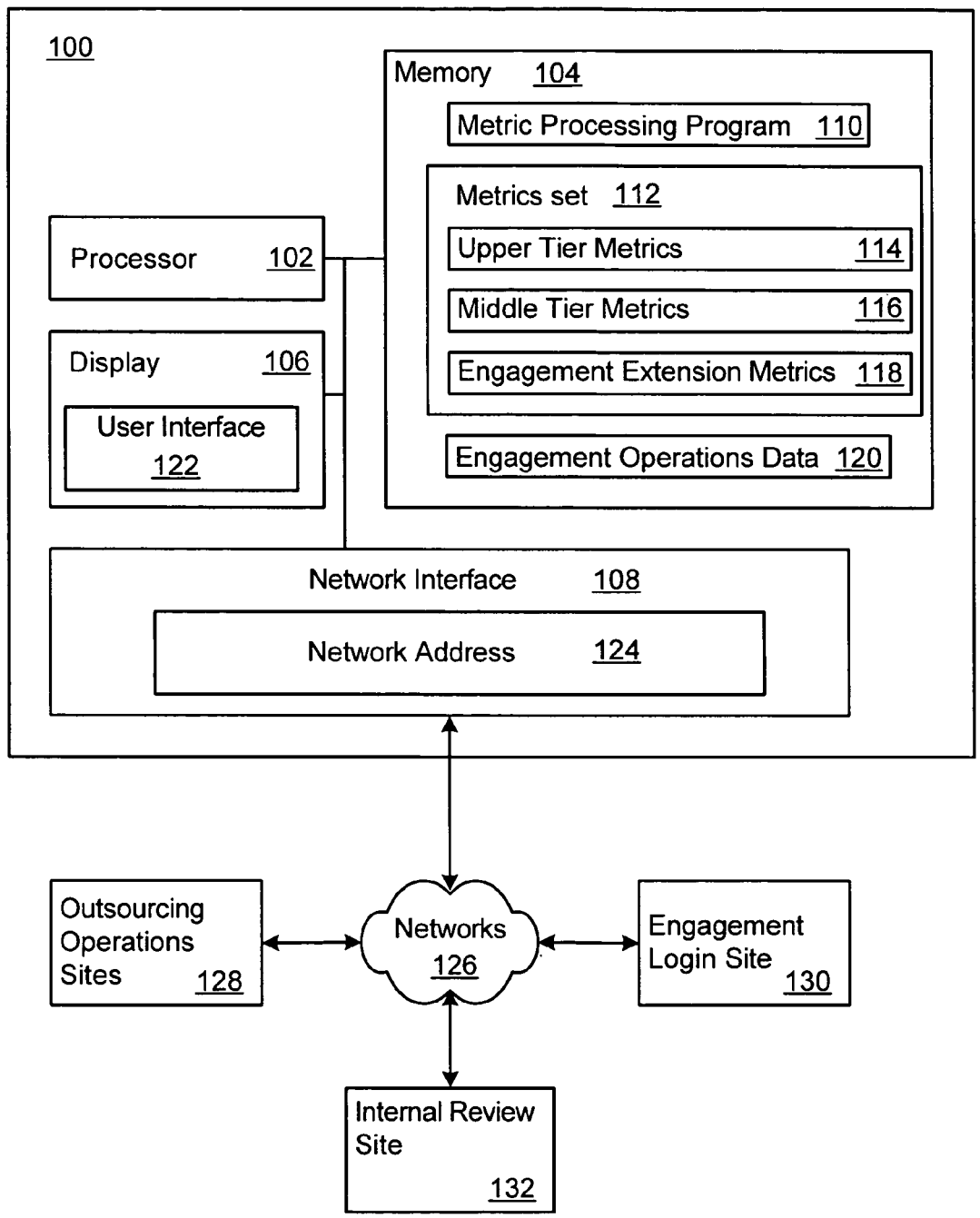
FIG. 1 illustrates a data processing system that may implement an outsourcing command center.

FIG. 1 shows a data processing system that may implement an outsourcing command center 100. The command center 100 includes a processor 102, a memory 104, and a display 106. In addition, a network interface 108 is present.

The memory 104 stores a metric processing program 110, and a metrics set 112. The metrics set 112 includes upper tier metrics 114, middle tier metrics 116, and engagement extension metrics 118. Engagement operations data 120 may also be present in the memory 104.

Any of the metrics 112-118 may be inward facing metrics, outward facing metrics, or both. Inward facing metrics may be metrics that are determined, but that are not reported to an engagement. Instead, the inward facing metrics may be reviewed and analyzed for internal management of the command center 100, an engagement, or for other reasons. Outward facing metrics may be metrics that are reported to an engagement.

The processor 102 generates a user interface 122 on the display 106. As will be explained in more detail below, the user interface 122 may provide a metric reporting interface that presents processed metrics to an engagement or internal reviewer logged into the command center 100. To that end, the metric reporting interface may include drill-down links distributed over one or more user interfaces screens that present the processed metrics in increasingly detailed or increasingly specific form.

The network interface 108 may include a network interface card or other network connection device to connect the command center 100 to internal or external networks 126. The networks 126 connect, in turn, to one or more outsourcing operations sites 128, one or more engagement login sites 130, and one or more internal review sites 132. As examples, the outsourcing operations sites 128, engagement login sites 130, and internal review sites 132 may include computers communicating over a dial-up modem, DSL, T1, or other network connection with the command center 100.

The outsourcing operations sites 128 may represent local or remote locations where outsourcing operations are performed for an engagement, or where outsourcing data relevant to an engagement outsourcing operation is present. The engagement login sites 130 may represent local or remote locations from which an engagement may connect to the command center 100 to review statistics relating to their outsourced business functions. Similarly, the internal review sites 132 may represent local or remote locations from which administrators, outsourcing offering or marketing executives, or other internal individuals who provide, configure, or run the command center 100 may access the command center 100 to investigate outsourcing performance for their engagements or to investigate the performance of the command center 100 itself.

The networks 126 may adhere to one or more network topologies and technologies. For example, the networks 126 may be Ethernet networks, but in other implementations may be implemented with a Fiber Distributed Data Interconnect (FDDI) network, Copper Distributed Data Interface (CDDI) network, or another network technology.

The network interface 108 has one or more network addresses 124. The network address 124 may be a packet switched network identifier such as a Transmission Control Protocol/Internet Protocol (TCP/IP) address (optionally including port numbers), or any other communication protocol address. Accordingly, the command center 100 may communicate with local or remote outsourcing operations sites 128, engagement login sites 130, and internal review sites 132.

In one implementation, the networks 126 may be IP packet switched networks, employing addressed packet communication between the command center 100 and the outsourcing operations sites 128. Different or additional communication protocols may be employed to support communication between the command center 100 and individual outsourcing operation sites. Thus, the networks 126 may represent a transport mechanism or interconnection of multiple transport mechanisms for data exchange between the command center 100 and the outsourcing operations sites 128 and engagement login sites 130.

Figure 2:
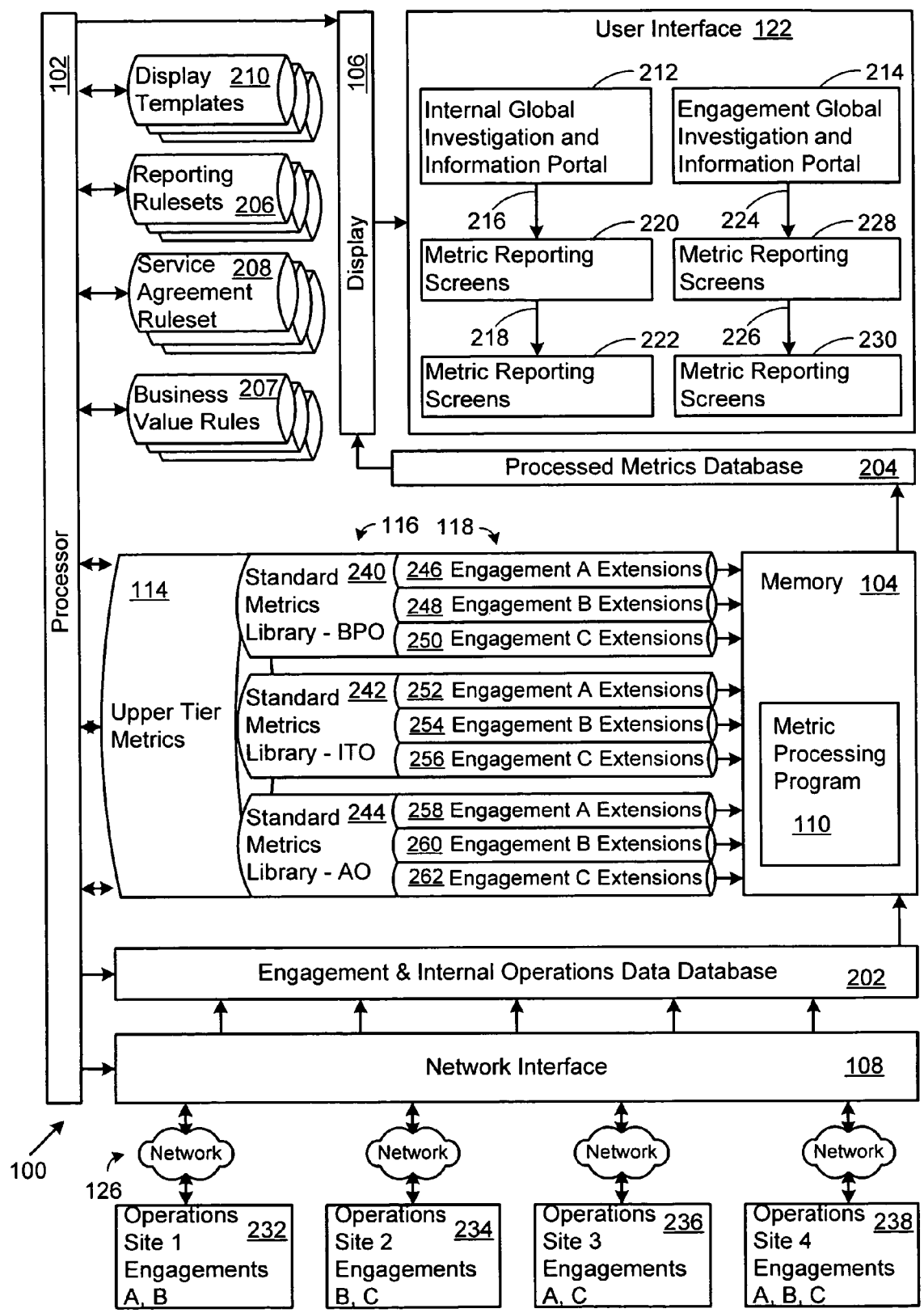
FIG. 2 shows a detailed block diagram of the data processing system of FIG. 1.

FIG. 2 expands upon the view of the command center 100 shown in FIG. 1. FIG. 2 shows an engagement operations database 202, a processed metrics database 204, and one or more rulesets. As examples, the rulesets may include a reporting ruleset 206 such as an aggregation reporting ruleset, a business value delivered ruleset 207, and a service agreement ruleset 208. Display templates 210 for the user interface 122 are also present.

The user interface 122 may include an internal investigation portal 212 and an engagement investigation portal 214. The portals 212 and 214 may accept a login and password that authorize access to the command center 100. Each portal is explained in more detail below. The internal investigation portal 212 may provide links 216, 218 to one or more metric reporting screens such as the screens 220 and 222. Similarly, the engagement investigation portal 214 may provide links 224, 226 to one or more metric reporting screens such as the screens 228 and 230.

The links 216, 218, 224, and 226 may provide access to or between the screens 220-222 and 228-230. The links 216, 218, 224, 226 may be html hyperlinks, buttons, or other user interface elements that connect to additional screens, graphics, or other data in the command center 100. One or more links may form one or more drill-down link sets to or between metric reporting screens. The drill-down link sets may then provide reporting on engagement outsourcing metrics in a progressively more detailed manner.

The command center 100 communicates through the networks 126 with local or remote engagement outsourcing operations sites. As examples, FIG. 2 shows the outsourcing operation sites 232, 234, 236, and 238. Each outsourcing operation site 232-238 may perform one or more aspects of one or more outsourcing offerings for any engagement.

By way of example only, the outsourcing operations site 232 may provide Business Process Outsourcing (BPO) functions for engagements A and B. The outsourcing operations site 232 may provide additional or different business processing outsourcing functions for engagements B and C, as well as application outsourcing functions for engagements B and C. The outsourcing operations site 236 may provide Application Outsourcing (AO) functions for engagements A and C. The outsourcing operations site 238 may provide Information Technology Outsourcing (TIO) for engagements A, B, and C.

FIG. 2 shows that the metrics set 112 may include the upper tier metrics 114, the middle tier metrics 116, and the engagement extension metrics 118. Individual metrics may repeat between or may overlap between the upper tier metrics 114, middle tier metrics 116, and engagement extension metrics 118. The upper tier metrics 114 may include one or more outsourcing metrics applicable to multiple outsourcing offerings. For example, upper tier metrics apply to BPO, AO, and TIO outsourcing. The middle tier metrics 116 may include one or more outsourcing metrics applicable to a particular outsourcing offering. The middle tier metrics may include BPO metrics 240, TIO metrics 242, and AO metrics 244.

Each engagement may specify additions or extensions to any of the upper tier metrics 114 or middle tier metrics 240-244. FIG. 2 shows that engagement A BPO extension metrics 246, engagement B BPO extension metrics 248, and engagement C BPO extension metrics 250 established in the command center 100. Also established are engagement A TIO extension metrics 252, engagement B TIO extension metrics 254, and engagement C TIO extension metrics 256 established in the command center 100. Engagement A AO extension metrics 258, engagement B AO extension metrics 260, and engagement C AO extension metrics 262 are also established in the command center 100.

Examples of upper tier metrics 114 are shown below in Table 1. Examples of middle tier BPO metrics 240 are shown below in Table 2. Examples of middle tier AO metrics 244 are shown below in Table 3. Examples of engagement extension metrics are shown below in Table 4.

TABLE 1

| Upper Tier Metrics |
|---|
| Business Value Delivered Category |
| Engagement Margin |
| Workforce Mix |
| Cash Flow |
| Service Excellence Category |
| Engagement Satisfaction |
| Percentage of SLAs Met |
| Percentage of Critical SLAs Met |
| Percentage of SLAs Missed More than Once |
| Fees at Risk |
| Process Excellence Category |
| CQMA Process Compliance |

TABLE 1-continued

| Upper Tier Metrics |
|---|
| Organizational Excellence Category |
| Average Training Hours Per Employee |
| Employee Satisfaction Rating |
| Percentage of Unplanned Employee Attrition |
| Headcount Variance |

TABLE 2

| Middle Tier Metrics |
|---|
| BPO Metrics |
| Business Value Category |
| Revenue Per FTE |
| Total Revenue |
| Gross Margin |
| Gross Margin % |
| EVA Charges |
| Controllable Income |
| Controllable Income % |
| Payroll % of Revenue |
| Service Excellence Category |
| No. High Impact Exceptions & Service Issues |
| CQMA Engagement Satisfaction |
| Process Excellence Category |
| Overheads % of Revenue |
| Key Accounts Not Fully Reconciled % |
| Organization Excellence Category |
| Total Headcount (FTEs) |
| Ave. Cost Per Seat |
| % Days Absence |
| Overtime % |

TABLE 3

| Middle Tier Metrics |
|---|
| AO Metrics |
| Business Value Category |
| Return on Investment |
| Average Cost per Service Request |
| Speed to Market |
| Average Cost Per Hour |
| % Offshore Resources |
| Service Excellence Category |
| End User Satisfaction Rating |
| CQMA Engagement Satisfaction |
| SLA Compliance Percentage |
| Performance to Budget |
| Performance to Schedule |
| Response Time by Priority |
| Resolution Time by Priority |
| Backlog Volumes by Priority for Support |
| Backlog Volumes by Priority for Development |
| Average Age of Backlog by Priority for Support |
| Average Age of Backlog by Priority for Development |
| Process Excellence Category |
| Fault Rate |
| Defect Rate |
| Percentage of Rework |
| Peer Review Execution Rate |
| Percentage of KPAs Achieved (CMM Level n) |
| Thousand Lines of Code (KLOC) or Function Point per Employee for Development |

TABLE 3-continued

Middle Tier Metrics

Thousand Lines of Code (KLOC) or Function Point per Employee for Support

Organization Excellence Category

Employee Utilization and Chargeability

Percentage of Planned Employee Attrition

TABLE 4

Engagement Extension Metrics

| BPO Metric Example | TIO Metric Example | AO Metric Example |
|---|---|---|
| Percentage error rate of accounts payable, based on the number of correct, incorrect, and total number of invoices processed. | Percentage of network downtime | The percent of existing resource capacity spent during the period on working maintenance requests traced to all defects and faults. |

An engagement may span multiple types of outsourcing. For example, an engagement may include both AO and BPO. The command center 100 may apply metrics from one or more tiers of metrics to the engagement. In the example given above, the command center 100 may apply metrics from both Table 2 and Table 3 to the engagement.

In addition, the command center 100 may display or otherwise make available any of the metrics for internal review, for example by personnel employed by the outsourcing provider. The command center 100 may also display or otherwise make available any of the internal metrics for review by personnel associated with the engagement itself. Accordingly, the command center 100 may communicate metrics that the engagement may employ to determine operational and service level performance of the outsourcing provider handling their outsourced operations.

The outsourcing operations sites 232-238 collect engagement outsourcing data for each outsourcing function performed on behalf of each engagement. For example, the operations site 238 may collect TIO data such as the number of service requests handled, average response time, the nature of each service request, the location of each requester, and other TIO data. Outsourcing operations sites that perform AO functions may collect AO data including application name and version outsourced, amount of downtime per hour, day, month, or other time frame, performance of the outsourced application, number of simultaneous executions of the outsourced application, and other AO data. Similarly, outsourcing operations sites that perform BPO functions may collect BPO data including accounts payable data, fixed asset accounting data, billing data, general accounting data, capital and expense projection accounting data, reimbursement data, cash application data, tax accounting data, credit and collection data, time and expense data, finance center management data, and vendor payment data, and other BPO data.

In one implementation, the command center 100 may automatically schedule transfer of the engagement outsourcing data from each operations site 232-238 to the command center 100. For example, the command center 100 may periodically execute file transfer programs that retrieve files of engagement outsourcing data and store them in the engagement operations data database 202. The command center 100 also may collect outsourcing data through manual data input via a keyboard, mouse, or other data entry interfaces, through manual data transfer on a floppy disk or other medium, or through any other data entry or data transfer mechanism.

The command center 100 also may perform pre-processing operations on the engagement outsourcing data. For example, the command center may process the engagement outsourcing data for storage according to a common data model for a data warehouse, including dimension tables and fact tables, in the engagement operations database 202. The command center 100 may thereby consistently store, retrieve, and process the data across all engagements during subsequent processing operations.

Instances of dimension tables and fact tables in the engagement operations database 202 may store metric information. The dimension tables may provide underlying numerical measures and keys that relate facts to the dimension tables. The fact tables may store numeric or other fields that may represent metric data or other data applicable at the intersection of the dimension keys in the fact table.

As one example, a measurement dimension table may be defined to store fundamental descriptors of a metric. Additional measurement dimension tables may be established to setup temporal dimensions such as a yearly, quarterly, monthly, weekly, daily, or time dimension. The engagement operations database 202 also establish fact tables for market unit or operating group, outsourcing capability offering, and delivery locations or geographic areas on a yearly, quarterly, or monthly basis that store data according to the established dimensions.

The processed metrics database 204 may also include dimension tables and fact tables in a data warehouse model for the processed metrics. The metrics processing programs 110 may access the processed metrics database 204 as one step in generating the reporting elements discussed below. The processed metrics database 204 may include a metric dimension, monthly dimension, and a comment dimension. A fact table for metric values may then organize metric values according to monthly key and a metric key.

The processed metric database 204 may further organize metric data in one or more multi-level hierarchies. For example, the processed metrics database 204 may define hierarchical fact tables to organize the processed metric data. The hierarchical fact tables may establish one or more levels of geographic hierarchy, customer hierarchy, or service hierarchy, as examples.

In operation, the processor 102 the command center 100 executes metrics processing programs 110 at any scheduled period, frequency, or time slot, or according to any other execution schedule, optionally selected by each engagement. The metrics processing program 110 retrieves the engagement outsourcing data from the database 202 and applies the metrics appropriate for each engagement to the engagement outsourcing data. Processed engagement metrics result and may be stored in the processed metrics database 204.

As an example, the command center may process BPO metrics for Engagement C. Accordingly, the metrics processing program 110 may retrieve an engagement extended metric set for the BPO offering. For example, the engagement extended metric set may include the upper tier metrics 114, the middle tier BPO metrics 240, and the engagement C BPO extension metrics 250. The metrics processing program 110 may also retrieve the engagement C outsourcing data from the database 202.

The metrics processing program 110 applies the engagement extended metric set to the engagement C outsourcing data. Processed engagement C BPO metrics result, and may be stored in the processed metrics database 204. The metrics processing program 110 may also prepare reporting elements for the user interface 122 to display.

To that end, the metrics processing programs 110 may also include graphical, textual, or audible reporting tools. For example, the metrics processing programs 110 may generate scorecards, dashboards, line charts, bar charts, pie charts, or any other graphical reporting element that presents processed metrics. Examples of suitable metrics processing programs 110 including programs for service level management, application availability, network management, database monitoring, or systems management include Sharepoint, Microsoft Reporting Services, and SqlServer products available from Microsoft, Help Desk/Call Center Management Tools available from SupportWorks, Remedy, Siebel, and Peregrine, ERP Systems/Workflow Tools available from SAP, Oracle, Mercury ITG, EAI Tools such as Microsoft BizTalk, Tibco, and SeeBeyond, Business Service Management/Infrastructure Monitoring Tools, such as BMC SIM (formerly Mastercell), Proxima Centauri, Managed Objects Formula, Smarts SAM Solution, HP Overview and Add-ons, and Mercury Interactive Topaz, Process Management Tools such as Nimbus Control ES, Documentum, Crystal Reports software, Crystal Enterprise software, Crystal Analysis software, Performance Manager, and/or Dashboard Manager, software available from Business Objects of San Jose, Calif. Other programs may be employed in addition to or as alternatives to those noted above.

The command center 100 displays processed metrics through the user interface 122. More specifically, the command center 100 may accept an engagement login at the engagement information portal 214 or an internal login at the internal information portal 212. Both portals 212, 214 may be combined into a single portal. In one implementation, the command center 100 may employ Sharepoint Portal Server™ software available from Microsoft of Redmond Wash. to provide secure login and access to the command center 100.

Once an engagement has logged in, the engagement may access the metric reporting screens appropriate for that engagement. Continuing the example above, engagement C may access BPO reporting screens that report the results of the metrics processing discussed above. While the reporting screens may include graphical or textual data, they may also include multi-media content such as text messaging, email, and/or audible reporting.

The command center 100 builds one or more metric reporting screens appropriate for each engagement. Accordingly, the command center 100 may retrieve the display templates 210 established for engagement C. The display templates 210 may take the form of user interface screen definitions, including graphical element layout, positioning, color, size, font, window or frame size and positions, and other graphical specifiers, links between screens, and any other user interface element or object that may appear on a screen.

A different display template may be established for each engagement, for each outsourcing offering, or for each engagement and for each outsourcing offering, as examples. Alternatively, each engagement may share one or more portions of a display template 210 to define common elements on the screens for each engagement. The display templates 210 may define html, xml, or other web-based documents, suitable for display in a browser window through which the engagement interacts with the command center 100.

The reporting rulesets 206 may include rules that specify what form, shape, color, or other aspect a reporting element may take, based on the results of the metrics processing. The reporting rulesets 206 may be established for each engagement, for each outsourcing offering, for each reporting element, or for any combination of those three. FIG. 3 shows a high level example of a reporting rule 300 for a Sales & Marketing reporting element (e.g., a stoplight that may display a Red light, a Yellow light, or a Green light).

The reporting rule 300 includes a Green condition 302, a Yellow condition 304, and a Red condition 306. In addition, the reporting rule 300 includes an engagement identifier 308 and a metric identifier 310. The engagement identifier 308 provides a numeric, string, or other data type entry that associates the reporting rule 300 with a particular engagement. Similarly, the metric identifier 310 provides a numeric, string, or other data type entry that associates the reporting rule with a metric, in this case a Selling, General, and Administrative (SG&A) metric.

The green condition 302 specifies that when SG&A expenditures are below a lower threshold (e.g., $350,000), the command center 100 should display the SG&A reporting element as a Green light. Similarly, the yellow condition 304 specifies that when SG&A expenditures are between the lower threshold and an upper threshold (e.g., $500,000) the command center 100 will display the reporting element as a Yellow light. The red condition 306 specifies that when SG&A expenditures are above the upper threshold, the command center 100 will display the reporting element as a Red light.

Note that the metrics may be associated with outsourcing offerings in general, but may also be categorized within an outsourcing offering. As one example, a Return on Investment (ROI) metric may be part of a Business Results Achieved category of BPO offering metrics. The category may include additional metrics, such as an Average Cost per Service Request metric. Detailed examples of BPO metrics, categories, metric calculations and Red/Yellow/Green display reporting rules are given below in Tables 5-8. Note that any given metric need be not limited to a single outsourcing offering. Instead, a metric may be applied to multiple outsourcing offerings.

Taking an example from Table 5, the ROI metric may be calculated as a percentage by subtracting program costs from program benefits, then dividing by program costs, then multiplying by 100. The user interface 122 may display the ROI metric as a percentage, as a decimal, using a graphic, or using any other reporting element. A Target value may be selected for ROI. When ROI is greater than the Target, the user interface 122 may display the reporting element in Green; when the ROI is in jeopardy of not meeting the Target, the user interface 122 may display the reporting element in Yellow; when the ROI is less than the Target, then the user interface 122 may display the reporting element in Red.

TABLE 5

Business Value Delivered Category

| Sub-Category | Metric | Description | Calculation Example |
| --- | --- | --- | --- |
| Business Results Achieved | Return on Investment (ROI) | This metric measures the business results achieved by comparing development costs against realized benefits based on actuals. | ((Program Benefits - Program Costs)/ Program Costs) * 100 |
| Business Results Achieved | Average Cost per Service Request | This metric measures the business results achieved by measuring the cost per service request adjusted for volume of requests. | Total Cost of Maintenance/Total Number of Service Requests |

TABLE 5-continued

| | | | |
|---|---|---|---|
| Cycle Time Improvements | Speed to Market | This metric compares the number of work days required to complete a project to other projects of similar size. | Time to Complete Project/ Time to Complete Project of Similar Size |
| Financial Excellence | Engagement Margin | This metric measures the margin percentage for the engagement. | (Net Revenue/Total Program Costs) * 100 |
| Financial Excellence | Average Cost per Hour | This metric measures the average cost of services delivered by the IT Organization. | Total Cost of Services/ Total Hours |
| Financial Excellence | Percentage of Offshore Resources | This metric measures the percentages of offshore personnel | (Number of Offshore Personnel/Total Number of Personnel) * 100 |
| Financial Excellence | Workforce Percentages | These metrics measure the makeup of the workforce: Consulting, Services, Solutions Workforce, and Contractor. | (Total Number of Consulting Personnel/ Total Number of Personnel) * 100 (Total Number of Services personnel/ Total Number of Personnel) * 100 (Total Number of Solutions Workforce personnel/Total Number of Personnel) * 100 (Total Number of Contractors/Total Number of Personnel) * 100 |

| Business Value Delivered Metrics | | | | |
|---|---|---|---|---|
| Metric | Field Descriptions | Green | Yellow | Red |
| Return on Investment (ROI) | Program Benefits may be the Total Benefits (profit) from a Program. Program Costs may be the Total Cost of Program. The user interface may display this metric as a percentage. | ≧Target | Slightly below Target | Significantly below Target |
| Average Cost per Service Request | Total Cost of maintenance may be the Direct Labor + Indirect Labor + Non-labor Costs. Number of service requests may be the Total number of requests over a pre-selected time period. The user interface may display this metric as a dollar value. | ≦Target | Slightly above Target | Significantly above Target |
| Speed to Market | Time to Complete Project may be the Number of Months to Complete Projects. Time to Complete Projects of Similar Size may be the Average number of months to complete projects of similar size. The user interface may display this metric as a comparison of months. | ≦Target | Slightly above Target | Significantly above Target |
| Engagement Margin | Net Revenue may be the Total Revenue from Services. Total Cost may be the Total Cost of Services Delivered. The user interface may display this metric as a percentage. | ≧Target | Slightly below Target | Significantly below Target |
| Average Cost per Hour | Total Cost of Services may be the Total Dollar cost of services. Total Hours to Deliver Service may be the Total | ≦Target | Slightly above Target | Significantly above Target |

TABLE 5-continued

| | Number of Hours needed to deliver requested services. The user interface may display this metric as a dollar value. | | | |
|---|---|---|---|---|
| Onshore: Offshore Percentages | Total Number of Offshore Personnel may be the Total number of personnel categorized as Offshore. Total Number of Personnel may be the Total number of offshore personnel + Total Number of Onshore Personnel. The user interface may display this metric as a percentage of total personnel. | ≧Target | Slightly below Target | Significantly below Target |
| Workforce Percentages | Total Number of Consulting, Services, SWF, Contractor Personnel may be the Total number of each type of personnel. | ≧Target | Slightly below Target | Significantly below Target |
| | Total Number of Personnel may be the Total number of personnel in IT organization. The user interface may display this metric as percentages of types of personnel | ≦Target based on Targets set for each type of Personnel | Slightly above Target | Significantly above Target based on Targets set for each type of Employee |

TABLE 6

Process Excellence Category

| Sub-Category | Metric | Description | Calculation Example |
|---|---|---|---|
| Quality/Reliability | Fault Rate | This metric may measure the number of faults per thousand lines of code (KLOC), or per function point or feature point (FPs) detected after the software has been delivered to production. | Total Number of Faults Reported/Total Delivered FPs or KLOCs or Total Number of Faults Reported/Total number of Earned Hours Engagements with size data available may measure based on FPs or KLOCs. Engagements without size data may measure based on Effort or Earned Hours. |
| Quality/Reliability | Defect Rate | This metric may measure the number of defects per KLOC (or FPs) detected after the software has been delivered to the next phase(s) of development. | Total Number of Defects Reported/Total Delivered FPs or KLOCs or Number of Defects Detected after software is delivered to next phase/Actual Original Development Effort Engagements with size data available may measure based on FPs or KLOCs. Engagements without size data may measure based on Effort or Earned Hours. |
| Quality/Reliability | Percentage of Rework | This metric may measure the amount of effort spent performing rework on deliverables from previous phases. | (Rework Hours/Total Actual Original Development Hours) * 100 |

TABLE 6-continued

| | | | |
|---|---|---|---|
| Process Compliance | Peer Review Execution Rate | This metric may measure how well Peer Reviews are being executed. The peer reviews examine the content in scope deliverables. | (Total Number of Peer Reviews Conducted/ Number of Peer Reviews Planned) * 100 |
| Process Compliance | SQA Execution Rate | This metric may measure how consistently Software Quality Assurance (SQA) Reviews are being executed. | (Total number of SQA reviews Conducted/ Number of SQA Reviews Planned) * 100 |
| Process Compliance | SQA Process Compliance | This metric may measure the percentage of time standard IT processes were followed. Each project having an SQA Review may use a standard SQA Plan. A Standard SQA plan may ask a series of questions to determine if the appropriate processes were followed. A defect may be any time there is a No-Response to a SQA question. | (Total Number of SQA Process Review defects/ Total SQA Process Review Opportunities) * 100 |
| Certification Targets Achieved | Percentage of KPAs Achieved (CMM Level n) | This metric may measure the organization's ability to achieve required Key Process Areas (KPAs). | (Number of KPAs Met/ Total Number of KPAs assessed) * 100 |
| Productivity Levels (Development) | KLOC/Function Point per Full Time Equivalent (FTE) | This metric may measure the development productivity of the organization by KLOC or FP. | Total Number of KLOCs (or FPs) Delivered/ Total Number of FTEs |
| Productivity Levels (Maintenance) | KLOC/Function Point per FTE | This metric may measure the maintenance productivity of the organization by KLOC or FP. | Total Number of KLOCs (or FPs) Supported/ Total Number of FTEs |

| Process Excellence Metrics | | | | |
|---|---|---|---|---|
| Metric | Field Descriptions | Green | Yellow | Red |
| Fault Rate | Total Number of Faults Reported may be the Total number of Faults (defects found post production) reported in a selected timeframe. Total Number of Delivered FPs or KLOCs may be the Function points or KLOCs that account for the engagement's application software (newly developed and/or reused), the execution architecture, and the development architecture. Total number of Earned Hours for Release may be the Total number of hours earned for a release within a specific period of time. The user interface may display this metric as Fault Rate per Size or Effort. This metric may also be tracked as an SLA metric. | ≦Target | Slightly above Target | Significantly above Target |
| Defect Rate | Total Number of Defects Reported may be the Defect Rates for all phases completed period-to-date, averaged. Initially, each project may be weighted equally. However, relative weighting (in terms of project size) may be incorporated based on engagement specifications. Total Number of Delivered FPs or KLOCs may be the Function points or KLOCs developed that are delivered to the next development phase. Actual Development Effort may be | ≦Target | Slightly above Target | Significantly above Target |

TABLE 6-continued

| | | | | |
|---|---|---|---|---|
| | the Total Number of original development hours. The user interface may display this metric as Defect rate per Size or Effort. This metric may also be tracked as an SLA metric. | | | |
| Percentage of Rework | Rework Hours may be the Total number of hours spent on post implementation rework, such as fixing deliverables from prior phases. Total Development Hours may be the Total number of development hours (direct hours) for developing deliverables. The user interface may display this metric as a percentage. This metric may also be tracked as an SLA metric. | ≦Target | Slightly above Target | Significantly above Target |
| Peer Review Execution Rate | Number of Peer Reviews conducted may be the Total number of reviews conducted during review phase. Number of Peer Reviews Planned may be the Total number of reviews planned during review phase. The user interface may display this metric as a percentage. | ≧Target | Slightly below Target | Significantly below Target |
| SQA Execution Rate | Number of SQA reviews conducted may be the Total number of SQA reviews conducted for in scope projects. Number of SQA Reviews planned may be the Total number of reviews planned for in scope projects. The user interface may display this metric as a percentage. | ≧Target | Slightly below Target | Significantly below Target |
| SQA Process Compliance | Total Number of SQA Process Review Defects may be the number of "No" responses to an SQA Process question. Total SQA Process Review Opportunities may be the Total applicable questions asked (total "Yes" + "No" responses). The user interface may display this metric as a percentage. | ≦Target | Slightly above Target | Significantly above Target |
| Percentage of KPAs Achieved (CMM Level n) | Number of KPAs met may be the Total number of KPAs that the organization meets during an assessment. Total Number of KPAs assessed may be the Total Number of KPAs being assessed during an assessment. The user interface may display this metric as a percentage. | ≧Target | Slightly below Target | Significantly below Target |
| KLOC/ Function Point per Full Time Equivalent (FTE) | Total Number of KLOCs (or FPs) Delivered may be the Total number of KLOCs or FPs developed during the development effort. Total Number of FTEs may be the Total number of FTEs included in Development Effort. The user interface may display this metric as rate of KLOC or FP per FTE. | ≧Target | Slightly below Target | Significantly below Target |
| KLOC/Function Point per FTE | Total Number of KLOCs (or FPs) Supported may be the Total number of KLOCs or FPs in an application portfolio. Total Number of FTEs may be the Total number of FTEs providing maintenance and support. The user interface may display this metric as KLOC or FP per FTE. | ≧Target | Slightly below Target | Significantly below Target |

TABLE 7

| Sub-Category | Metric | Description | Calculation Example |
|---|---|---|---|
| colspan="4" | Service Excellence Category |||
| Engagement Satisfaction | Engagement Satisfaction Rating | This metric measures the percentage of Executives who are 'satisfied' with overall IT Service delivered. | (Total number Executives 'satisfied'/Total Number of Executives Surveyed) * 100 |
| Engagement Satisfaction | End User Satisfaction Rating | This metric measures the percentage of End-Users who are 'satisfied' with the IT service they received. | (Total number End Users 'satisfied'/Total Number of End Users Surveyed) * 100 |
| SLA Compliance | SLA Compliance Percentage | This metric measures the organization's ability to meet SLA requirements. | (Total Number of SLAs met/Total Number of SLAs) * 100 |
| Outcome Predictability | Performance to Budget | This metric measures the percentage of Projects completed on or under Budget. | (Number of Projects completed on or under budget/Number of Projects completed YTD) * 100 |
| Outcome Predictability | Performance to Schedule | This metric measures the percentage of Project Start and End Dates which occur "on time". | (Number of Projects completed on time or early/Number of Projects completed YTD) * 100 |
| Response/ Turnaround Time | Response Time by Priority | This metric measures the percentage of calls responded to within established parameters. | (Total Number of Calls responded to within established Response Time by Priority/Total Number of Calls) * 100 |
| Response/ Turnaround Time | Resolution Time by Priority | This metric measures the percentage of calls resolved within established parameters. | (Total Number of Calls Resolved within established Resolution Time by Priority/Total Number of Calls) * 100 |
| Throughput | Backlog Volume by Priority | This metric measures the size of the backlog by priority and gives the organization a sense of throughput ability. | Total Number in Backlog by Priority |
| Throughput | Average Age of Backlog by Priority | This metric measures the average age of the backlog by priority and gives the organization a sense of their throughput ability. | (Sum of all active requests (Current Date – Request Start Date))/ Total number of Active Requests |

| Metric | Field Descriptions | Green | Yellow | Red |
|---|---|---|---|---|
| colspan="5" | Service Excellence Metrics |||||
| Engagement Satisfaction Rating | Number of Executives who are 'satisfied' may be the Total Number of Executives who are 'satisfied' (e.g., selected a numerical designation (e.g., '4') for Satisfied on a survey) or 'Very Satisfied' (e.g., selected a numerical designation (e.g., '5') for Very Satisfied on a survey). Total number of Executives surveyed may be the Total Number of Executives who responded to the Survey. The user interface may display this metric as a percentage. | ≧Target | Slightly below Target | Significantly below Target |
| End User Satisfaction Rating | Number of End Users who are 'satisfied' may be the Total Number of End Users who are 'satisfied' (4) or 'Very Satisfied' (5). Total number of End Users surveyed may be the Total Number of End Users who responded to the Survey. The user interface may display this metric as a percentage. | ≧Target | Slightly below Target | Significantly below Target |

TABLE 7-continued

| | | | | |
|---|---|---|---|---|
| SLA Compliance Percentage | Total number of SLAs met may be the Total number of SLAs met (for a specific time period). Total Number of SLAs may be the Total number of SLAs being tracked. The user interface may display this metric as a percentage. | ≧Target | Slightly below Target | Significantly below Target |
| Performance to Budget | Number of Projects completed on or under budget may be determined as being within +/− x % of Budget calculated as (Planned Effort − Actual Effort)/Planned Effort) * 100). Number of Projects completed YTD may be the Total number of projects completed YTD. The user interface may display this metric as a percentage. | ≧Target | Slightly below Target | Significantly below Target |
| Performance to Schedule | Number of Projects completed on time or early may be determined as being within 'x' number of days of Schedule Completion calculated as (Planned Date - Actual Date)/ Planned Date) * 100). Total Number of Projects completed YTD may be the Total number of projects completed within the YTD. The user interface may display this metric as a percentage. | ≧Target | Slightly below Target | Significantly below Target |
| Response Time by Priority | Total Number of calls responded to within established Response Time by Priority may be the Total number of calls reported, response time starts from the time the problem is reported and may be segmented by severity of business impact (Priority 1, 2, 3+). Total Number of calls may be the Total number of calls generally segmented by severity of business impact (Priority 1, 2, 3+). The user interface may display this metric as a percentage. | ≧Target | Slightly below Target | Significantly below Target |
| Resolution Time by Priority | Total number of calls resolved within established Resolution Time by Priority may be the Total number of calls resolved, resolution time starts from the point the problem is reported and may be segmented by business impact (Priority 1, 2, 3+). Total number of calls may be the Total number of calls generally segmented by severity of business impact (Priority 1, 2, 3+). The user interface may display this metric as a percentage. | ≧Target | Slightly below Target | Significantly below Target |
| Backlog Volume by Priority | Open Problems Previous Month End. This metric may include the Number of Problems that had open status on the last business day of the previous month (and may or may not have been closed since). New Problems Current Month. This metric may also include the Number of New problems that have an opened or submit date in the current month. Closed Problems Current Month. This metric may also include the Number of Problems where status was changed to Closed in the current month Calculations that include this metric may omit problems that have an On Hold status. | ≦Target | Slightly above Target | Significantly above Target |

TABLE 7-continued

| | | | | |
|---|---|---|---|---|
| Average Age of Backlog by Priority | Sum of all active requests may be the Total age of all active requests. Current Date may be the Date the backlog was queried. Request Start Date may be the Original assigned start date. Total Number of Active Requests may be the Sum of all active requests. The user interface may display this metric as Average Age in days. | ≦Target | Slightly above Target | Significantly above Target |

TABLE 8

| Organizational Excellence Category | | | |
|---|---|---|---|
| Sub-Category | Metric Name | Description | Calculation Example |
| Training Effectiveness | Training Hours per Employee | This metric measures the annualized hours per employee spent on process and technical training. | Total Number of training hours YTD/Total Number of IT Employees/12 Months per Year |
| Employee Satisfaction | Employee Satisfaction Rating | This metric measures the percentage of IT employees who are 'satisfied' with their jobs. | (Total number IT Employees who are 'satisfied'/Total Number of IT Employees Surveyed) * 100 |
| Attrition | Unplanned Employee Attrition | This metric measures the percentage of the workforce that leaves voluntarily (unmanaged). | (Number of Unplanned Departures/Total Number of IT Employees) * 100 |
| Attrition | Planned Employee Attrition | This metric measures the percentage of the workforce that leaves as planned (managed). | (Number of Planned Departures/Total Number of IT Employees) * 100 |
| Utilization | Employee Utilization/Chargeability | This metric measures the percentage of hours spent on IT activities. | Annualized Calculation: Total number of Direct hours/Total number of Planned Hours, where Planned Hours may be: (Standard hours per FTE per year * Total Number of employees * Number of Months/12 Months per Year) And Monthly calculation 1-(Non-Direct Hours in Reporting Month/(Total Hours in Reporting Month)) × 100% Both monthly and annualized data may be collected. Unit can choose one or both, both may be aggregated and reported. |

| Organizational Excellence Metrics | | | | |
|---|---|---|---|---|
| Category | Field Descriptions | Green | Yellow | Red |
| Training Hours per Employee | Total number of training hours YTD may be the Total number of hours categorized as training hours YTD. Total Number of IT employees may be the Total number of IT employees. Number of Months may be the Total number of months YTD. The user interface may display this metric as training hours. | at Target | Slightly above Target or Slightly below Target | Significantly above Target or Significantly below Target |

TABLE 8-continued

| | | | | |
|---|---|---|---|---|
| Employee Satisfaction Rating | Total number of IT Employees who are 'satisfied' may be the Total number of IT Employees who respond as 'satisfied' or 'very satisfied' according to a survey. Total number of IT Employees surveyed may be the Total Number of IT Employees who responded to the Survey. The user interface may display this metric as a percentage. | ≧Target | Slightly below Target | Significantly below Target |
| Unplanned Employee Attrition | Total number of unplanned departures may be the Employees who leave the organization in an unplanned manner. Total number of IT employees may be the Total number of IT Employees. The user interface may display this metric as a percentage. | ≦Target | Slightly above Target | Significantly above Target |
| Planned Employee Attrition | Total number of planned departures may be the Employees who leave the organization in a planned manner. Total number of IT employees may be Total number of IT Employees. The user interface may display this metric as a percentage. | at Target | Slightly above Target or Slightly below Target | Significantly above Target or Significantly below Target |
| Employee Utilization/Charge ability | Total hours spent on IT activities categorized as productive YTD (directly related to support and/or development) may be the Total hours spent on activities categorized as IT YTD. Non-Direct Hours may be those categorized as non-direct (administration, general training, management, career development, general meetings) Standard hours may be the Standard hours per FTE per year (e.g., 2080 hours) reduced by anticipated holidays, training, vacation time, sick time, and jury duty. Total Number of IT employees may be the Total number of IT employees. Number of Months may be the Total number of months YTD. The user interface may display this metric as percentage of hours. | at Target | Slightly above Target or Slightly below Target | Significantly above Target or Significantly below Target |

Each exemplary category shown in Tables 5-8 may be represented on the user interface using any graphical, textual, audible or other reporting element. In some implementations, the reporting element for a category may represent a summary, average, or other consolidated view of multiple underlying metrics in the category. The category presentation may thereby represent a "rolled-up" view of one or more metrics into fewer display elements.

Links, buttons, menus, or other user interface elements may then implement a drill-down sequence through a set of progressively more detailed views of the underlying metrics. For example, a reporting element may provide a rolled-up summary of the Business Results Achieved category of BPO metrics. The user interface 122 may then include a link associated with the rolled-up summary to a display of the individual underlying metrics, as examples, the ROI and Average Cost per Service Request metrics.

Figure 4:
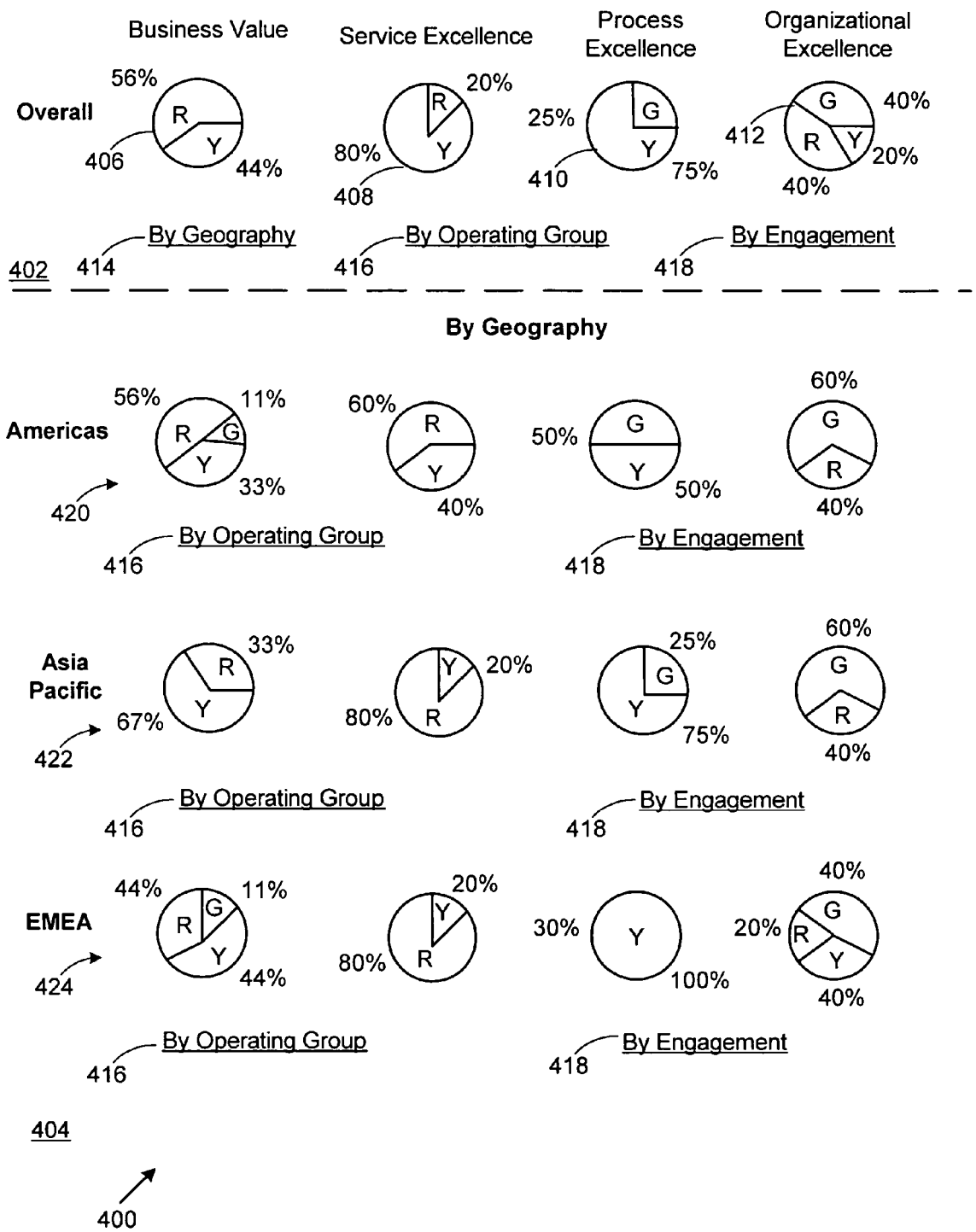
FIG. 4 shows a drill-down link set to progressively more detailed views of outsourcing metrics.

FIG. 4 shows one example of metrics reporting screens 400 linked by a drill-down link set to progressively more detailed views of outsourcing metrics. In FIG. 4, an overall view screen 402 and a geographical detail view screen 404 are present. The Overall view screen 402 includes a rolled-up reporting pie chart 406 for the business value metric, a rolled-up reporting pie chart 408 for the service excellence metric, a rolled-up reporting pie chart 410 for the process excellence metric, and a rolled-up reporting pie chart 412 for the organizational excellence metric. The pie charts 406-412 may provide a view, at the highest level, of the performance of the corresponding metrics. For example, the pie chart 406 indicates that 56% of metrics are performing poorly (shown as red in the pie chart 406) and that 44% of metrics are performing adequately (shown as yellow in the pie chart 406).

The overall view may roll up metrics across multiple dimensions such as geography, operating group, and engagement. The overall view screen 402 also includes drill-down links to more detailed metric reporting screens. As shown in FIG. 4, the overall view screen 402 includes a geography link 414, an operating group link 416, and an engagement link 418. The command center 100 responds to a click on a link 414-418 by presenting a more detailed metric reporting screen according to the particular link clicked.

For example, when the command center 100 determines that the geography link 414 is activated, the command center 100 may display the geographical detail screen 404. The geographical detail screen 404 provides rolled-up summaries 420, 422, and 424 of the metrics by geography, in this case by the Americas, Asia Pacific, and Europe.

The rolled-up pie chart 406 may represent a summary of the rolled-up pie charts for business value across each geographical region 420, 422, and 424. Similarly, the rolled-up pie charts 408, 410, and 412 may also represent summaries of the rolled-up pie charts for service excellence, process excellence, and organizational excellence across the geographical regions 420, 422, and 424. Additional drill down links may be provided to reporting screens with further details underlying the pie charts shown in FIG. 4, including links all the way down to screens that display the actual metrics and the value of the metrics.

The metrics may be consolidated according to any criteria. For example, all BPO metrics may be consolidated into fewer (e.g., one) overall reporting element that represents an overall status of a BPO offering. As another example, multiple BPO metrics may be rolled-up into multiple sub-categories, the sub-categories may be rolled-up into higher level categories, and the higher level categories may be rolled-up into an overall BPO reporting element. Due to their customized nature, the command center 100 may optionally refrain from rolling-up the engagement extension metrics 246-262 into a summary view. Instead, the engagement extension metrics 246-262 may be reported separately from a rolled-up view of other metrics, such as standardized upper tier metrics 114 or middle tier metrics 116.

To summarize or roll-up underlying metrics, the command center 100 may apply any summary function to the metrics. For example, the command center 100 may apply an average or weighted average function, or may apply any other function that summarizes multiple inputs into fewer outputs. For example, as shown in FIG. 4, the command center 100 has summarized in one pie chart 406 that 56 percent of the metrics underlying business value are performing poorly and that 44 percent of the metrics underlying business value are performing only adequately.

Alternatively or additionally, one or more metric in each outsourcing offering may be summarized in a rolled-up outsourcing offering display element for each outsourcing offering, one or more of which may be rolled-up in to a summary across all outsourcing offerings, or sets of outsourcing offerings. The user interface 122 may then provide a drill-down link set to progressively more detailed views of the underlying rolled-up summaries, down to the individual underlying metrics, parameters, and target values that determine the metrics.

Figure 5:
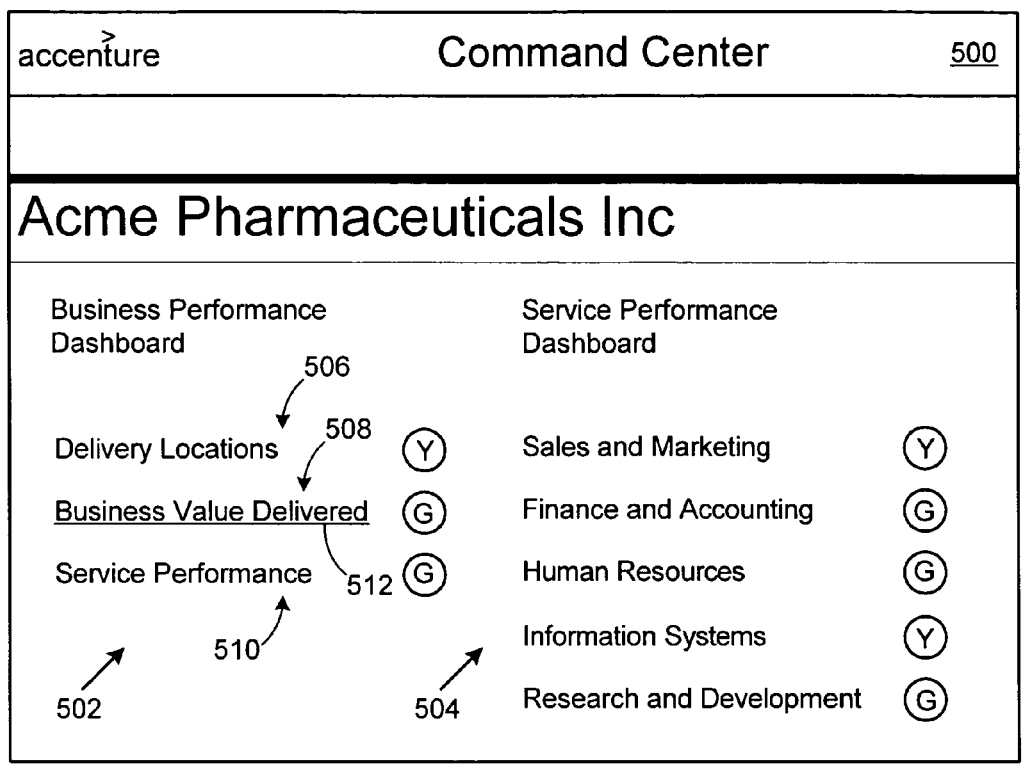
FIG. 5 shows an engagement metric reporting screen with drill-down links to detailed metric reporting screens.
Figure 13:
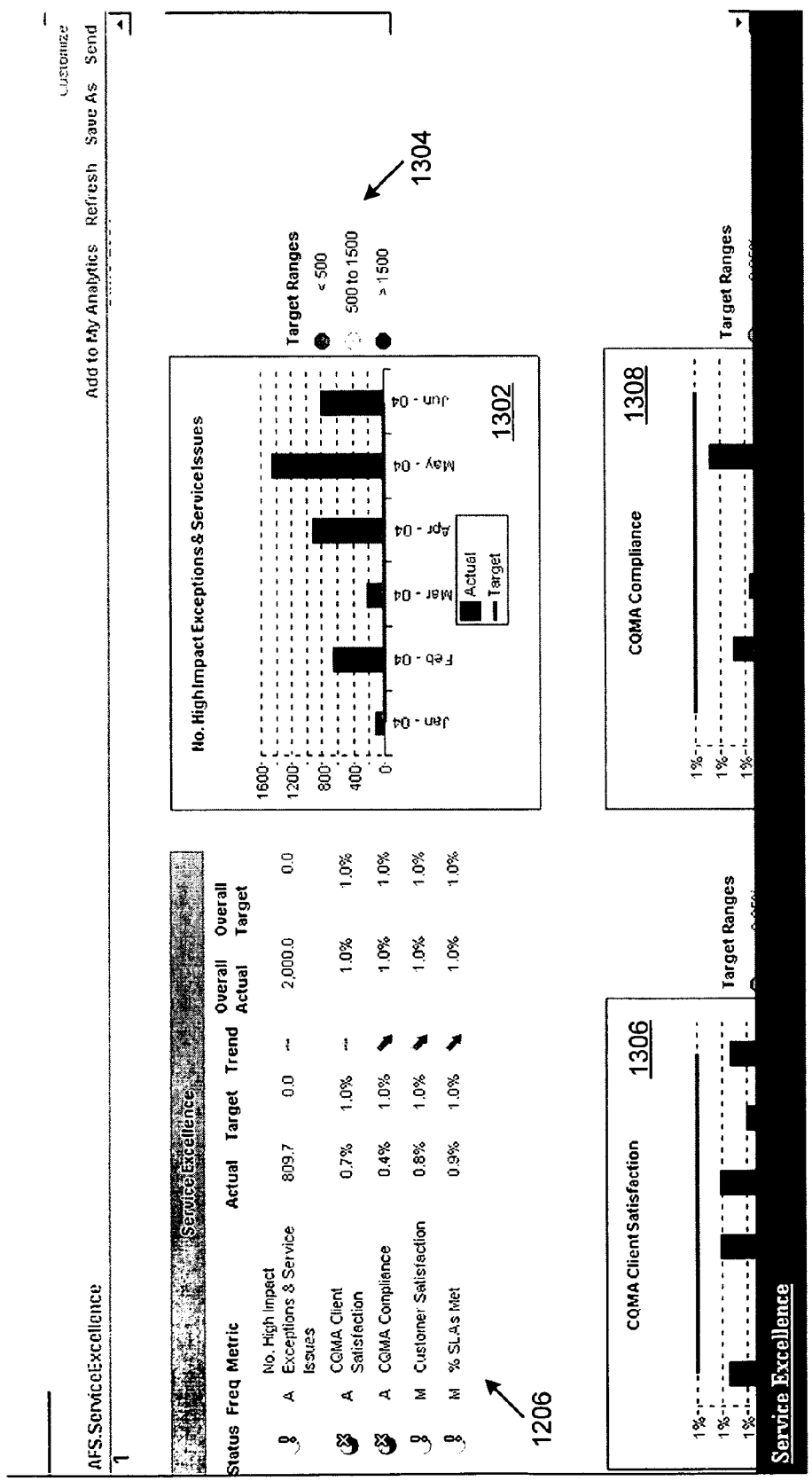
FIG. 13 shows a metric reporting screen with detailed metric reporting elements for a service excellence metric category.

FIG. 5 shows an example of an engagement metric reporting screen 500 with drill-down links to underlying metric reporting screens. Additional examples are shown in FIGS. 11-13 and described below. In FIG. 5, the reporting screen 500 is defined for the engagement Acme Pharmaceuticals Inc, according, for example, to the display templates 210. The display templates 210 may specify which metrics are displayed for the engagement on which screen, the location of each reporting element for each metric, the graphical reporting element to be used for each metrics, sizes, shapes, colors, orientations, or any other information relating to the content of the reporting screen 500. The reporting screen 500 includes a business performance dashboard 502 and a service performance dashboard 504.

The business performance dashboard 502 presents a rolled-up view or summary of the status for selected aspects of a BPO offering. The dashboard 502 includes a delivery locations summary 506 in addition to a business value delivered summary 508 and a service performance summary 510. The reporting elements for the summaries 506-510 are stoplights, although other graphics, text representations, multimedia representations, or other representations may alternatively or additionally be employed as reporting elements.

The summaries 506-510 may include links to views of their underlying metrics. For example, the business value delivered summary 508 may include a link 512 to the summary reporting screen 600 shown in FIG. 6. The reporting screen 600 provides reporting elements 602, 604, 606, 608, 610, and 612 in the form of dashboards for the underlying components of the business value delivered summary 508. Each reporting element 602-612 may provide a drill-down link to additional detail on each underlying metric.

Figure 6:
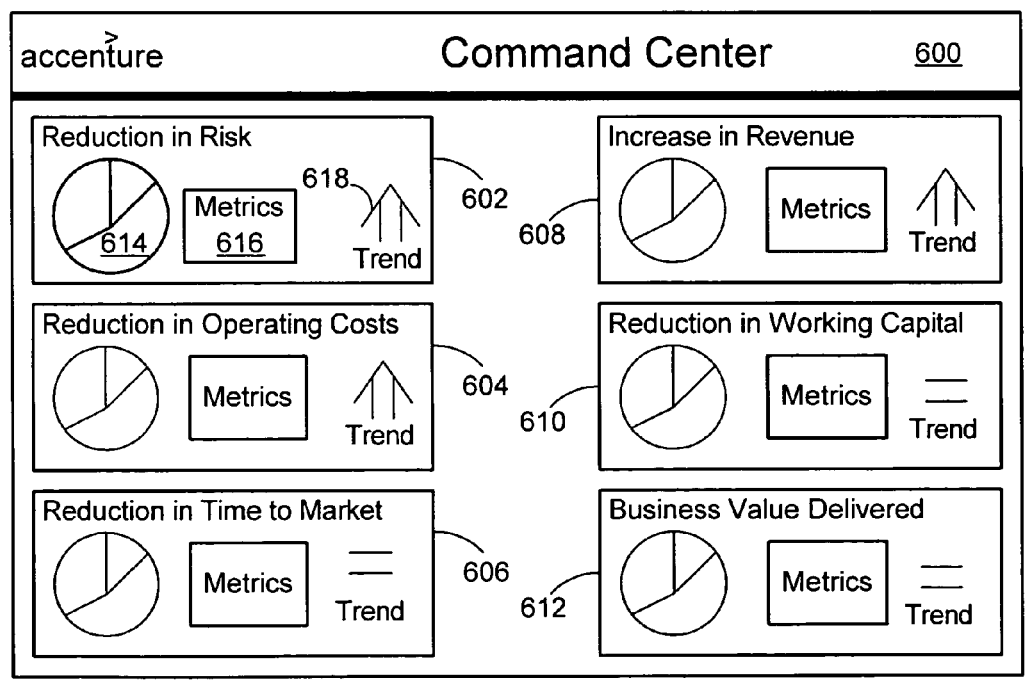
FIG. 6 shows an engagement metric reporting screen with detailed metric reporting elements.

The reporting elements 602-612 provide additional information on the metrics underlying the business value delivered summary 508. As shown in FIG. 6, the reporting element 602 provides a summary view of a Reduction in Risk metric, the reporting element 604 provides a summary view of a Reduction in Operating Costs metric, and the reporting element 606 provides a summary view of a Reduction in Time to Market metric. The reporting element 608 provides a summary view of an Increase in Revenue Metric, the reporting element 610 provides a summary view of a Reduction in Working Capital metric, and the reporting element 612 provides a summary view of the business value delivered summary 508.

The reduction in risk report 602 includes a graphical reporting element 614, a textual metric reporting element 616, and a trend indicator element 618. The graphical reporting element 614 is shown as a pie chart, but may take any other graphical form to convey information about one or more metrics to the engagement. Similarly, the textual metric reporting element 616 may set forth parameter values, metric names, or other textual elements that convey information about one or more metrics to the engagement. The trend indicator element 618 may show an up-trend, flat-trend, down-trend, or other trend information on a pre-selected time frame or interval with respect to the metrics. Each report 602-612 may include more, fewer, alternate or additional reporting elements to form the report.

The command center 100 provides business value delivered information for review and evaluation by key business decision makers. Although shown as a stoplight, the business value delivered summary 508 may be presented in many other ways and in many other forms. More generally, the command center 100 translates underlying low-level metrics to higher level business value delivered metrics. An example in the context of a Communications Service provider that supports Digital Subscriber Lines (DSL) is given below.

The DSL service provider is assumed to have outsourced Order to Cash (BPO) and supporting application systems (AO). Take-up of new product by customers of the DSL service is critical because of fierce competition for that customer, because take-up has a significant impact on revenue cash flow and operating costs, and because industry analysts respond to take-up in their analyses. The DSL business engages in a multi-step order process that consumes valuable time before a new customer may be billed. The time consumed before billing may occur is sometimes referred to as the cycle time.

The order process may include sales and customer contract activities, through which the DSL business identifies a new customer and generates a contract for the new customer; ordering activities, through which the DSL business enters contract and customer data in their processing systems; engineering activities, through which technical personnel determine whether the customer can be connected, or assign technicians to setup the service; service provision activities, through which the technicians take actions to install or start the service; service activation and test activities, through which the DSL business turns on the service and verifies its operation; and billing, at which point the DSL service can being earning revenue from the customer. Each activity may have underlying activities. For example, the ordering activities may include order entry, order qualification, credit verification, and meeting network requirements.

The outsourced functions may be characterized by many underlying metrics. As examples, the metrics may include the amount of time spent in each phase of the order process by product, geography, or other factor; the numbers and types of customers pre-sold, but then canceling; the numbers, types, and amounts of orders that require 'rework', the number of 'escalations' employed to expedite installation and delivery of the service; the number of passed and filed pre-qualifications; the number of activated services that match services subsequently billed (revenue leakage); the volumes of orders handled by agents and engineering (efficiency); and the volumes and lengths of calls from customers checking on order status or service status. Additional or different metrics may also be gathered.

The command center 100 may apply the business value delivered rules 207 to one or more detailed operational metrics to generate business value delivered metrics. The business rules 207 thereby translate detailed underlying metrics into higher level business value outcomes. The business value outcomes may vary widely between engagements. Six examples are shown in FIG. 6: Reduction in Risk, which may depend on a customer commitments met on time metric; Increase in Revenue, which may depend on revenue leakage and/or revenue recognition metrics; Reduction in Operating Costs, which may depend on operating costs metrics; Reduction in Working Capital; Reduction in Time to Market; and Business Value Delivered, which may depend on a customer satisfaction metric and/or a percentage of customer commitments met on time metric. One or more of the business value outcomes may be included in an Economic Value Added (EVA) calculation and reported.

Applying the business value delivered rules 207 to the underlying metrics yields the business value outcome metrics. A business value delivered rule 207 may be a function with low level metric input parameters and a high level business value output. As one example, a business value delivered rule 207 may be established to produce the Increase in Revenue business value outcome according to: Every x % improvement in or reduced ratio of customers leaving after a sale, but before order activation, yields y % of Increase in Revenue. As another example, every a % improvement or reduced number of days cycle time yields b % of Increase in Revenue through earlier revenue recognition.

In some implementations, the command center 100 may present metric summaries organized by geographical location. With regard to FIG. 7, for example, a geographical location screen 700 is shown. The screen 700 may include a map 702 and pinpoint locations on the map 702. The Prague pinpoint location 704 and the Minneapolis pinpoint location 706 are labeled in FIG. 7. An expansion window 708 is also present in FIG. 7.

In general, the map 702 may display a pinpoint location anywhere services are offered or performed for an engagement. Each pinpoint location may include a reporting element (e.g., a stoplight) that provides a rolled-up summary of the status, performance, or other aspect of an outsourcing offering occurring at that location. In addition, each pinpoint location may include a link or hotspot that upon activation (e.g., a mouse click or a mouse-over event) causes the command center 100 to show an expansion window for that pinpoint location.

Figure 7:
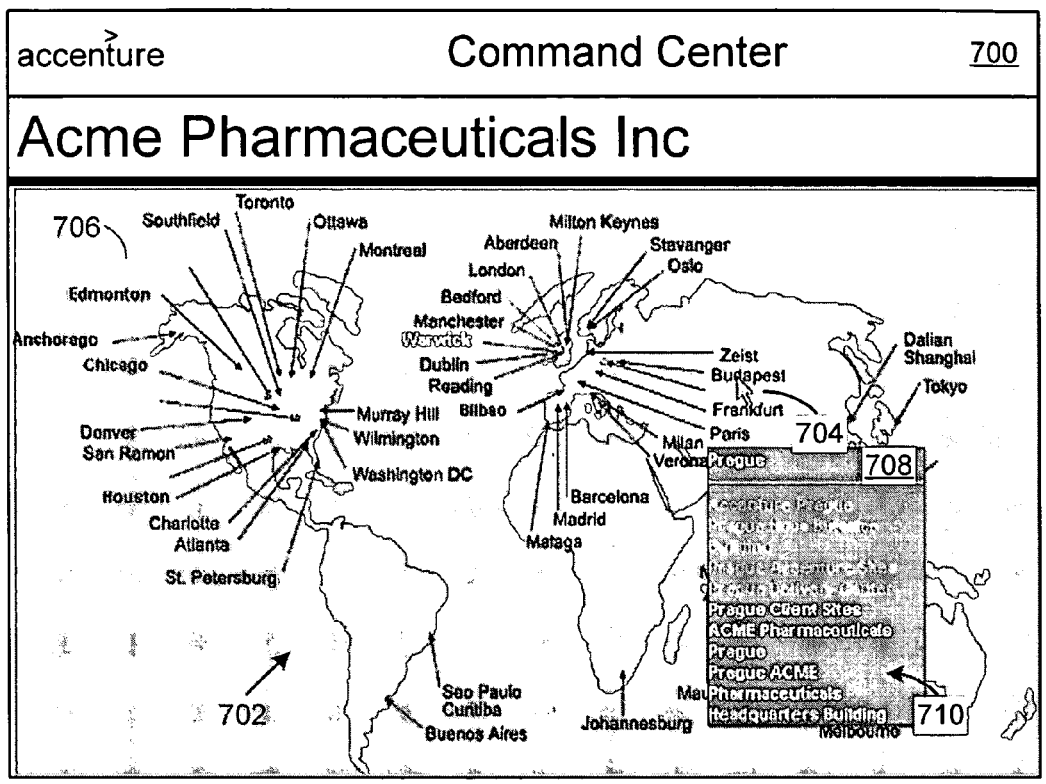
FIG. 7 shows a geographic location screen for reporting metrics.

The command center 100 displays the expansion window 708 when the Prague pinpoint location 704 is active. The expansion window 708 may display one or more rolled-up metrics 710, individual metrics, or other conditions that affect the status of the reporting element shown for the Prague pinpoint location 704 on the map 702. As shown in FIG. 7, the expansion window 708 lists underlying metrics for outsourcing operations in Prague.

Figure 8:
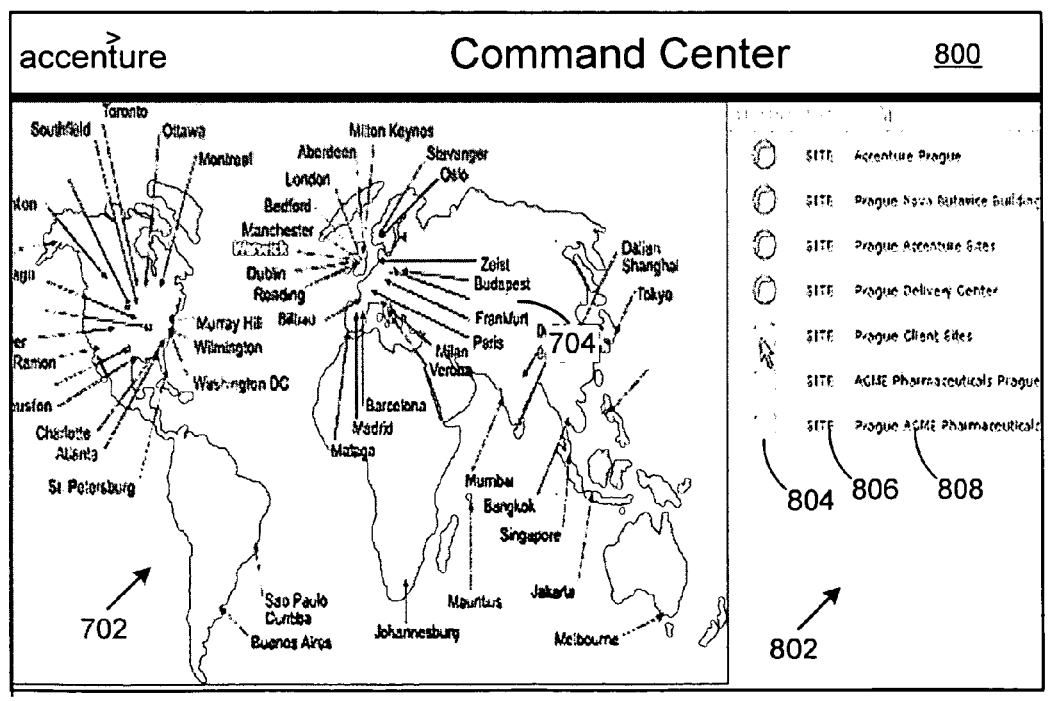
FIG. 8 shows a geographic location screen for presenting detail metric reports.

The command center 100 may respond to a click or other activation of a pinpoint location to display a reporting screen with additional detail underlying the status of the location. For example, FIG. 8 shows a reporting screen 800 that reports additional detail for the Prague pinpoint location 704. The additional detail may be the same or different than that presented in the expansion window 708, for example.

As shown in FIG. 8, the reporting screen 800 displays a detail panel 802 with the map 702. The detail panel 802 includes a more detailed display of reporting elements for metrics or other conditions underlying the overall status of the Prague pinpoint location 708. For example, the reporting element 804 is a stoplight that may assume a Green, Yellow, or Red color.

In addition, the detail panel may provide a type indicator 806 and a description 808 for each reporting element. The type indicator may specify whether the associated reporting element represents a single metric, a set of metrics, an outsourcing site, or another underlying parameter. For example, the reporting element 804 is a Site type reporting element associated with an outsourcing site in Prague for ACME Pharmaceuticals.

Each reporting element may include a link to additional more detailed reporting elements. For example, the reporting element 804 may provide a link to individual metrics, metric summaries, or other parameters underlying the Prague ACME Pharmaceuticals site. In other words, the reporting element may include a link or links from rolled-up metrics to more detailed underlying rolled-up metrics or individual metrics.

The location screen 700 may display pinpoint locations relevant to a particular engagement. For example, the delivery locations summary 506 in FIG. 5 may include a link to a location screen that provides additional detail underlying the status of the delivery locations summary 506. The additional detail may be one or more pinpoint locations with an associated rolled-up summary of outsourcing operations at that location.

Alternatively or additionally, location screens may be employed for internal review of one or more outsourcing offerings through the internal investigation portal 212. Accordingly, the location screen may reflect rolled-up summaries of outsourcing offerings on a local or global scale, across one or more engagements. As will be explained in more detail below, specific internal logins may be permitted access to selected sets of metrics, subsets of metrics, processed or unprocessed outsourcing data, or other data. The baseline metrics, subsets of baseline metrics, and other metrics may be geographically organized on a location screen such as that shown in FIG. 7.

Returning to FIG. 2, the service agreement rulesets 208 establish rules that may govern overall performance of outsourcing offerings. In one implementation, the service agreement ruleset 208 implements conditions included in Service Level Agreements (SLAs) or any other agreement setting forth expectations of performance, availability, or other characteristics of the outsourcing offering itself.

Figure 9:
FIG. 9 shows a service agreement rule that may be established in the outsourcing command center.

FIG. 9 shows an example of a service agreement rule 900 for Availability of an ITO offering. The service agreement rule 900 includes an engagement identifier 902, an offering identifier 904, and an agreement characteristic identifier 906. The service agreement rule 900 also includes a Green condition 908, a Yellow condition 910, and a Red condition 912.

As shown, the engagement identifier 902 associates the rule 900 with engagement C. The offering identifier 904 associates the rule 900 with the BPO offering (for engagement C), while the characteristic identifier 908 associates the rule 900 with Availability of the BPO functions. The Green condition 906 specifies that when the BPO functions are available for more than 99% of the time, the command center will display the availability reporting element as Green. The Yellow condition 910 specifies that availability between 80% and 99% results in a Yellow availability reporting element, while availability under 80% results in a Red availability reporting element according to the Red condition 912.

The conditions, characteristics and rule formats are not limited to those discussed above. Rather, the rulesets 206-208 may include additional, conjunctive, disjunctive, or other logical connections of one or more rules and may specify other tests, other results, or other characteristics. The rulesets 206-208 may include default level rules applicable to one or more engagements, and may be extended or tailored as specified by each individual engagement for each outsourcing offering. The individual rules may be formed from equations or logical tests in an Excel™ spreadsheet, from conditional statements in a program, from rules supported and defined using the metric processing programs 110, or in any other manner.

FIG. 10 illustrates one implementation of an access hierarchy 1000 that may authorize or deny access to data in the outsourcing command center 100. The access hierarchy discussed below is exemplary in nature only, and may vary widely between implementations. The access hierarchy may include access entries 1002, 1004, 1006, 1008, 1010, a login field 1012, and data access fields such as a metric access field 1014, and an engagement access field 1016. Additional or alternate access fields may be provided, for example that permit or deny access to specific types of reporting elements. The access hierarchy 1000 may be implemented by any permissions manager, such as a Lightweight Directory Access Protocol (LDAP) service, login, password, and access control provided by the metric processing programs 110 noted above, an operating system, or through another permissions control programs.

The login field 1012 specifies the command center login for which the access entry will apply. The metric access field 1014 specifies individual metrics or sets of metrics for which the login has or does not have access. The engagement access field 1016 specifies engagements or sets of engagements for which the login has or does not have access.

The access entries 1002-1008 may represent internal logins to the command center 100 for the company that provides the outsourcing offerings. For example, the access entry 1002 applies to a Chief Outsourcing Executive login. According to the access entry 1002, the Chief Outsourcing Executive has access to all metric data for all engagements. According to the access entry 1004, an Outsourcing Assistant login 1004 permits access to BPO and TIO metrics for all engagements. In other words, the Outsourcing Assistant has access to a subset of metrics within the command center 100.

Similarly, the access entry 1006 permits the BPO Executive login to view BPO metrics for engagements A and C. Thus, the access hierarchy 1000 may provide access to a subset of metrics and well as a subset of engagements. As another example, the access entry 1008 permits the TIO Executive login to view all TIO metrics for engagement C.

The access hierarchy 1000 may also specify the logins for individual engagements. For example, the access entry 1010 may specify permissions for Engagement C. In particular, as shown in FIG. 10, the access entry 1010 specifies that Engagement C has access to all of its own metrics.

The metric processing program 110 applies the metric set 112 to the engagement outsourcing data to generate the processed metrics data. For internal review, the user interface 122 and internal investigation portal 212 may display processed metrics in accordance with the access hierarchy 1000. For example, the metric reporting screens (such as those shown in FIGS. 4-8) may include reporting elements for all metrics and all engagements for access by the Chief Outsourcing Executive. Optionally, the command center 100 may summarize or roll-up multiple processed metrics into one or more baseline metrics.

As specified by the access hierarchy 1000, the metric reporting screens in the internal investigation portal 212 may omit metric reporting elements for certain metrics or certain engagements. For example, the outsourcing assistant login 1004 may view BPO and TIO metrics for all engagements. Accordingly, the metric reporting screens for the assistant login 1004 may omit metrics other than BPO and TIO metrics so that the outsourcing assistant login views a subset of all metrics.

FIG. 11 shows an example of a command center portal 1100 that may form part of the internal investigation portal 212. In this example, the portal 1100 includes an introduction and explanatory information for the portal 1100, as well as a summary reporting element 1102 of Finance Solutions offerings. The summary reporting element 1102 includes a Process Excellence section 1104, an Organizational Excellence section 1106, a Service Excellence section 1108, and a Business Value section 1110. In addition, the reporting element 1102 includes an overall scorecard section 1112. The sections 1104-1110 may represent categories of metrics that measure or quantify performance for a finance solutions outsourcing offering, for example.

The overall scorecard section 1112 provides a link to a performance summary view of the finance solution offerings. The link drills down from the high level reporting element 1102 to more detailed views of underlying metrics. For example, the drill down link may lead to the balanced scorecard details screen 1200 shown in FIG. 12.

The interface screen 1200 includes detailed tabular reporting elements for each of the metric categories underlying the financial solutions outsourcing offering. As shown in FIG. 12, the interface screen includes a Process Excellence table 1202, an Organizational Excellence table 1204, a Service Excellence table 1206, and a Business Value table 1208. Each table 1202-1208 includes detailed reporting elements for each metric in each category.

As shown in FIG. 12, the tables 1202-1208 include a status column, a frequency column (e.g., annual or monthly metric), and a metric name column. In addition, each table 1202-1208 includes actual and overall actual metric value columns, target value and overall target values columns, and a trend indicator column. Stoplight reporting elements are present in the status column and give a visual indication of how well the associated metric is performing. Other columns, reporting elements, or visual representations may be employed, however.

Each table 1202-1208 may include additional drill down links to more detailed views of metrics or additional information about the metrics. For example, the title bar of the Process Excellence table 1202 may include a link to a user interface screen with additional detail for the Process Excellence category of metrics. As another example, a navigation bar may provide links to additional interface screens. The navigation bar may include a region selector, a deliver center selector, and a client name selector. Other selectors or links may be provided, however.

The region selector may provide a drop down list of geographical regions (e.g., Europe, Asia, or North America) that an internal reviewer may select. In response, the command center 100 updates the user interface to report metrics measured on data received from the selected geographical region. The delivery center selector provides a drop down list of delivery center locations (e.g., Prague, Chicago, or Munich). The command center 100 responds to a delivery center location by reporting metrics measured on data received from the selected delivery center. The engagement name selector may provide a drop down list of engagement names for which the viewer has access to. The engagement names may represent engagements for which an internal reviewer has access permission to review engagement data. The command center 100 responds to an engagement selection by displaying metrics for the selected engagement.

Figure 14:
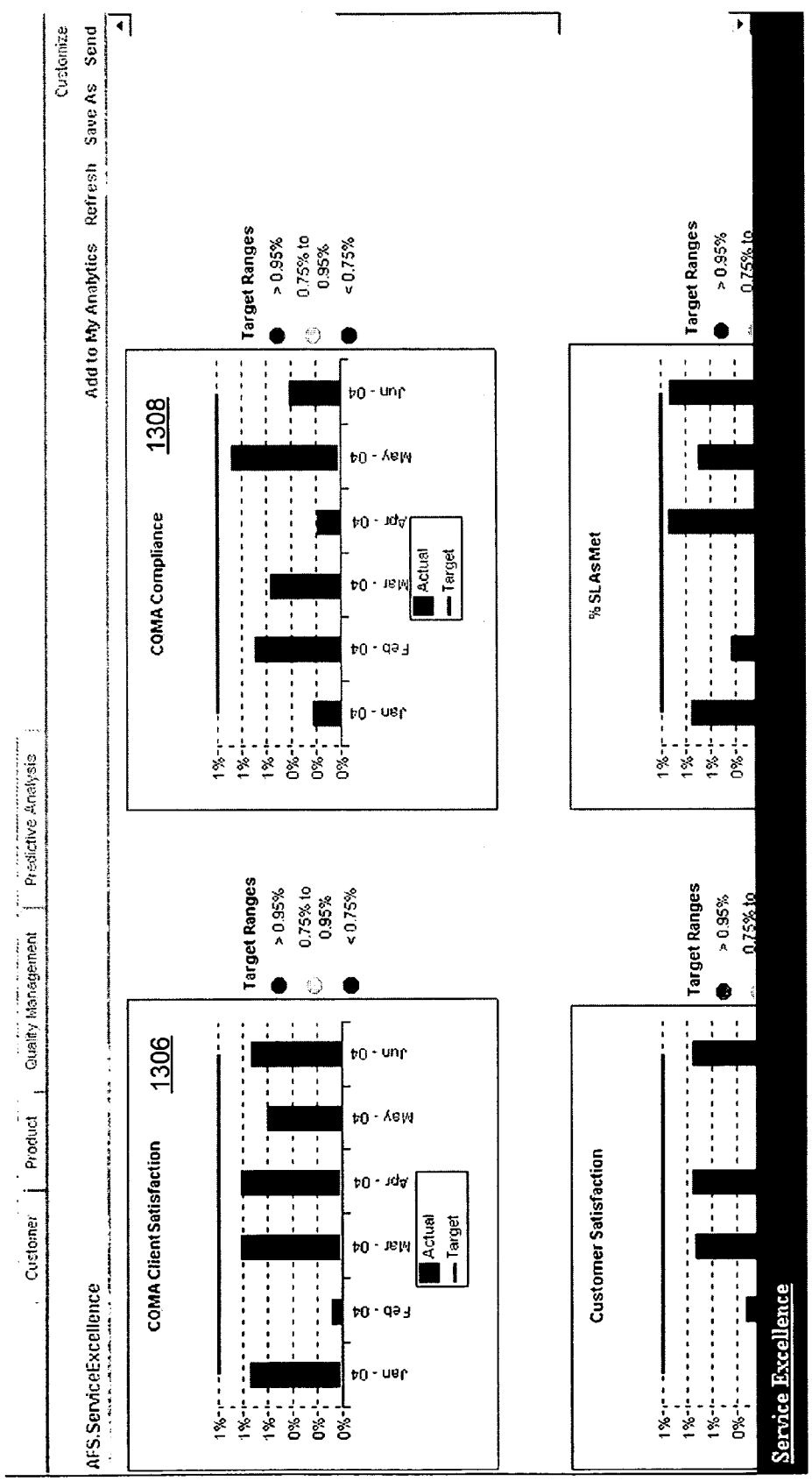
FIG. 14 shows a metric reporting screen for service excellence.

FIGS. 13 and 14 show an example of a metric reporting screen 1300 reachable by a drill down link in the interface screen 1200 for the service excellence category of metrics. The reporting screen 1300 shows the Service Excellence table 1206, and detailed reporting elements for metrics in the service excellence category. In particular, FIGS. 13 and 14 show a vertical bar graph 1302 for the Number of High Impact Exceptions metric, a vertical bar graph 1306 for the CQMA Client Satisfaction metric, and a vertical bar graph 1308 for the CQMA compliance metric. For each metric, the reporting screen 1300 may show the red, yellow, and green stoplight conditions 1304 established for the metric. Additional or alternative reporting elements may be employed to deliver the detailed information underlying each metric.

Figure 15:
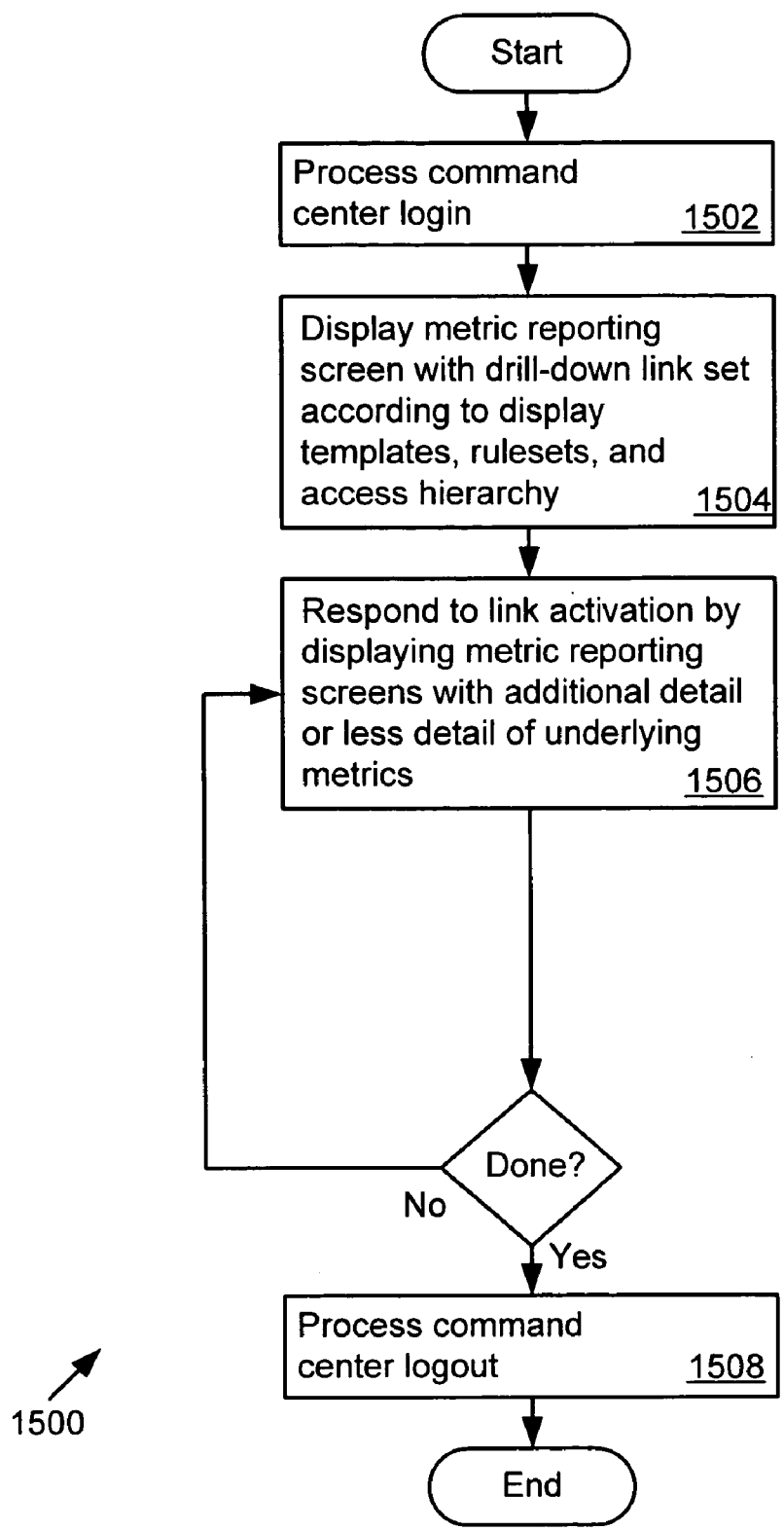
FIG. 15 shows the acts that may be taken by the command center shown in the Figures to display processed metric data.

FIG. 15 shows an example of the acts 1500 that may be taken by the command center 100 to display processed metric data. The command center accepts and processes a login (Act 1502). The login may be an engagement login, an internal login, or another type of login. Based on the login, the command center 100 may determine access permissions based on the access hierarchy 1000, for example.

As described above with reference to FIGS. 4-8, as examples, the command center 100 displays metric reporting screens (Act 1504). The metric reporting screens may be reached through an internal investigation portal 212, an engagement investigation portal 214, or another interface. The command center 100 may display the metric reporting screens in accordance with the display templates 210 that specify presentation characteristics such as reporting elements, colors, positions, sizes, orientations, window sizes, window positions, window content, or other characteristics for one or more engagements, one or more metrics, one or more sets of metrics, or for other sets or subsets of elements.

The metric reporting screens may include links to other screens. The other screens may set forth additional detail for one or more metrics. In that regard, the command center 100 may respond to link activations by displaying metric reporting screens that may include additional detail underlying rolled-up or summarized metrics on prior screens (Act 1506). The links included on the metric reporting screens may thereby form a drill-down link set that may assist the engagement or internal reviewer with accessing progressively more detailed views of initially rolled-up metrics.

When the engagement or internal reviewer is finished interacting with the command center 100, the engagement or internal reviewer may then log out. The command center 100 processes the logout (Act 1508).

Figure 16:
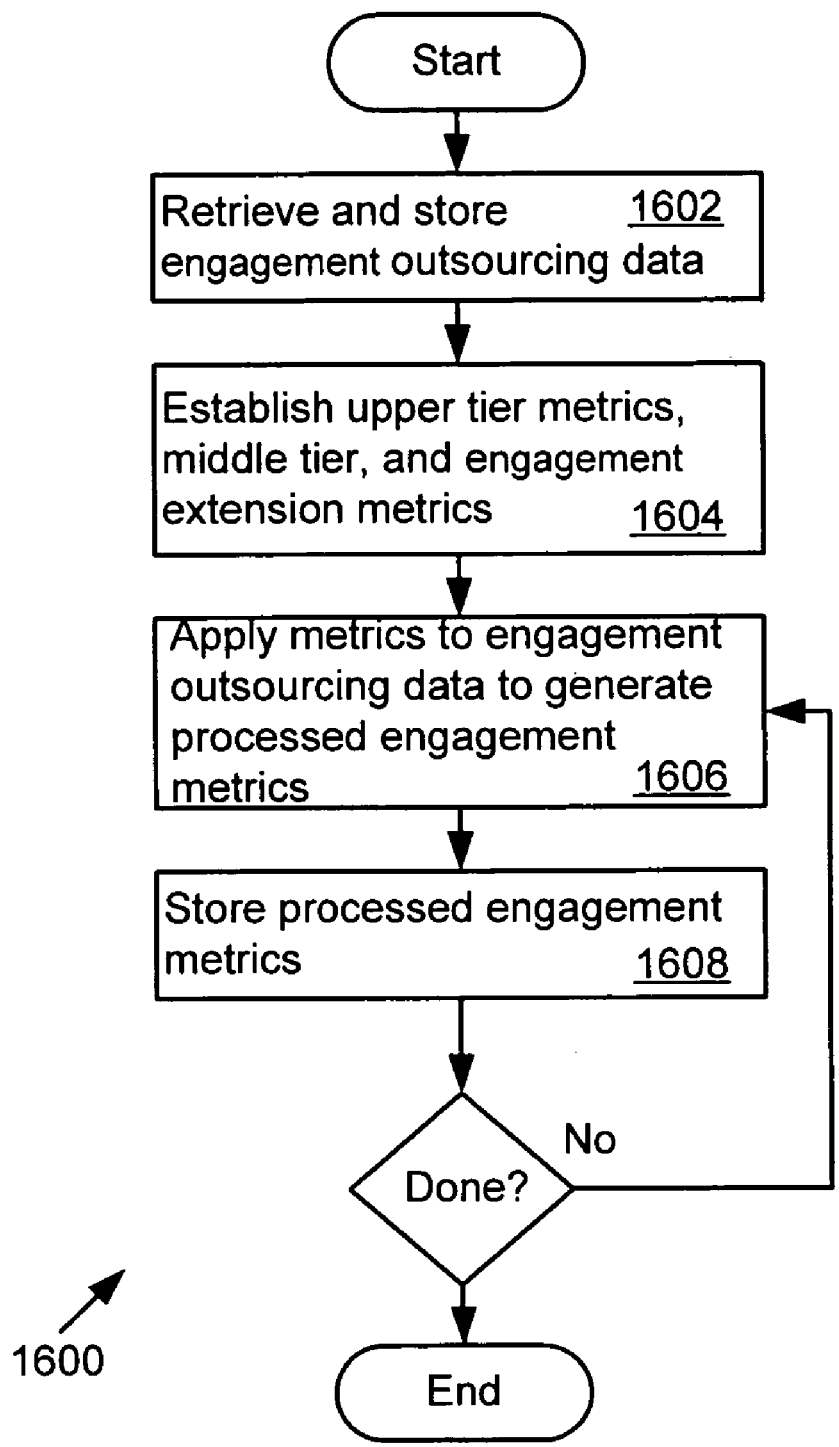
FIG. 16 shows the acts that may be taken by the command center shown in the Figures to process engagement outsourcing data.

FIG. 16 shows one example of the acts 1600 that may be taken by the command center 100 to process engagement outsourcing data. The command center 100 retrieves and stores engagement outsourcing data in the database 202 (Act 1602). For example, the command center 100 may automatically connect to the operations sites 232-238 and transfer engagement outsourcing data to the command center 100. Alternatively, the command center 100 may accept manual input or semi-automated input of engagement outsourcing data through input mechanisms including keyboards, scanners, user interface screens, and other input mechanisms.

The command center 100 also establishes engagement metrics 112 (Act 1604). The engagement metrics 112 may include an upper tier metric set 114, a middle tier metric set 116, and engagement extension metrics 118. The upper tier metric set 114 may include metrics that are applicable across multiple outsourcing offerings. The middle tier metric set 116 may include metrics that are generally applicable to a particular outsourcing offering such as BPO or TIO. The engagement extension metrics 118 may include metrics for any particular outsourcing offering chosen, extended, or modified by a particular engagement. Any of the metrics 112 may be stored in the command center 100 for application to engagement outsourcing data for one or more engagements.

The command center 100 may apply the metrics 112 to the engagement outsourcing data to generate processed engagement metrics (Act 1606). The command center 100 may thereby apply standardized metrics in the form of upper tier metrics 114 and middle tier metrics 116 to the engagement outsourcing data. The command center 100 may also apply the engagement extension metrics to generate processed engagement metrics according to criteria, if any, specified by an engagement. The processed engagement metrics may then be stored, for example, in the processed metrics database 204 (Act 1608).

The command center 100 may help centralize the review of outsourcing functions, internally and externally. Accordingly, a business may realize time and cost savings for monitoring the performance of multiple outsourced functions. In addition, a business may more readily gain an understanding of the performance impact on the business of its outsourced functions as a whole. Furthermore, because the command center 100 employs a regular metric set application to outsourced functions, the business may achieve a consistent reference for comparing the performance of different outsourced functions. The command center 100 may also provide convenient access to, and a common reference point for, internal review of outsourcing offerings.

It is therefore intended that the foregoing detailed description be regarded as illustrative rather than limiting, and that it be understood that it is the following claims, including all equivalents, that are intended to define the spirit and scope of this invention.

The invention claimed is:

1. A data processing system for engagement review of multiple outsourcing offerings, the data processing system comprising:
   a memory comprising:
      an upper tier metric set for multiple outsourcing offerings comprising a first outsourcing offering and a different second outsourcing offering;
      a first engagement extended metric set for the first outsourcing offering comprising:
         the upper tier metric set; and
         a first engagement extension comprising first outsourcing offering specific metrics specific to the first outsourcing offering, first engagement extended metric set threshold values and first engagement extended metric set calculations for the first outsourcing offering specific metrics;
      a second engagement extended metric set for the second outsourcing offering comprising:
         the upper tier metric set; and
         a second engagement extension comprising second outsourcing offering specific metrics specific to the second outsourcing offering, second engagement extended metric set threshold values and second engagement extended metric set calculations for the second outsourcing offering specific metrics;
   a database comprising engagement operations data from engagement outsourcing operation sites;
   a processor configured to execute a metric processing program comprising processor executable instructions that when executed cause the processor to:
      apply the first engagement extended metric set calculations to the engagement operations data to calculate first processed metrics values for first processed metrics;
      compare the first processed metrics values to the first engagement extended metric set threshold value to generate first processed metrics results for the first outsourcing offering;
      apply the second engagement extended metric set calculations to the engagement operations data to calculate second processed metrics values for second processed metrics; and
      compare the second processed metrics values to the second engagement extended metric set threshold value to generate second processed metrics results for the second outsourcing offering;
   where the processor is further configured to generate a user interface comprising a metric reporting interface for reporting the first and second processed metrics results, where the metric reporting interface comprises:
      a rolled-up summary of the first processed metrics results; or
      a rolled-up summary of the second processed metrics results; or
      a drill-down link to increasingly detailed reports of the first processed metrics results; or
      a drill-down link to increasingly detailed reports of the second processed metrics results; or
      any combination thereof, and
   wherein the processor is further configured to establish an access hierarchy comprising a first access entry authorizing access for a first login to baseline metrics, and a second access entry authorizing access to a first subset of the baseline metrics.

2. The data processing system of claim 1, further comprising a business value delivered ruleset, and where the metric processing program applies the business value delivered ruleset to generate business value delivered metrics.

3. The data processing system of claim 2, where the user interface further comprises a business value delivered reporting element that represents business value delivered responsive to at least one of the business value delivered metrics.

4. The data processing system of claim 1, where the first outsourcing offering is business process outsourcing (BPO), application outsourcing (AO), or information technology outsourcing (ITO).

5. The data processing system of claim 1, where the first outsourcing offering is business process outsourcing (BPO), application outsourcing (AO), or information technology outsourcing (ITO), and where the second outsourcing offering is BPO, AO, or ITO.

6. The data processing system of claim 2, where the business value delivered ruleset includes an Increase in Revenue rule.

7. The data processing system of claim 1, further comprising:
   a first pre-selected middle tier metric set tailored to the first outsourcing offering;
   a second pre-selected middle tier metric set tailored to the second outsourcing offering; and
   where the first engagement extended metric set further comprises the first pre-selected middle tier metric set and where the second engagement extended metric set further comprises the second pre-selected middle tier metric set.

8. A method for engagement review of multiple outsourcing offerings, the method comprising:
   storing engagement operations data in a memory;
   defining, in the memory, an upper tier metric set for multiple outsourcing offerings comprising a first outsourcing offering and a different second outsourcing offering;
   extending the upper tier metric set with a first engagement extension comprising first outsourcing offering specific metrics specific to the first outsourcing offering to define a first engagement extended metric set for the first outsourcing offering, the first engagement extended metric set comprising first engagement extended metric set threshold values and first engagement extended metric set calculations for the first outsourcing offering specific metrics;
   extending the upper tier metric set with a second engagement extension comprising second outsourcing offering specific metrics specific to the second outsourcing offering to define a second engagement extended metric set for the second outsourcing offering, the second engagement extended metric set comprising second engagement extended metric set threshold values and second engagement extended metric set calculations for the second outsourcing offering specific metrics;

executing, by a processor, a metric processing program to:
apply the first engagement extended metric set calculations to at least a portion of the engagement operations data to calculate first processed metrics values for first processed metrics; and
compare the first processed metrics values to the first engagement extended metric set threshold values to generate first processed metrics results for the first outsourcing offering;
apply the second engagement extended metric set calculations to at least a portion of the engagement operations data to calculate second processed metrics values for second processed metrics; and
compare the second processed metrics values to the second engagement extended metric set threshold value to generate second processed metrics results for the second outsourcing offering;
establishing, by the processor, an access hierarchy comprising a first access entry authorizing access for a first login to baseline metrics, and a second access entry authorizing access to a first subset of the baseline metrics; and
generating, by the processor, a user interface comprising a metric reporting interface for reporting the first and second processed metrics results, wherein the metric reporting interface comprises:
a rolled-up summary of the first processed metrics results; or
a rolled-up summary of the second processed metrics results; or
a drill-down link to increasingly detailed reports of the first processed metrics results; or
a drill-down link to increasingly detailed reports of the second processed metrics results; or
any combination thereof.

9. The method of claim 8, further comprising collecting at least a portion of the engagement operations data from a remote engagement operations site.

10. The method of claim 8, where extending the upper tier metric set with the first engagement extension comprises:
extending the upper tier metric set with the first engagement extension and a first pre-selected middle tier metric set tailored to the first outsourcing offering.

11. The method of claim 10, where extending the upper tier metric set with the second engagement extension comprises:
extending the upper tier metric set with the second engagement extension and a second pre-selected middle tier metric set tailored to the second outsourcing offering.

12. The method of claim 8, where defining an upper tier metric set comprises:
defining an upper tier metric set for a business process outsourcing (BPO) offering, an application outsourcing (AO) offering, or an information technology outsourcing (ITO) offering.

13. The method of claim 8, where defining an upper tier metric set comprises defining an engagement satisfaction metric.

14. The method of claim 13, where defining an upper tier metric set further comprises defining an employee satisfaction metric.

15. A machine readable medium encoded with instructions that cause a processor of a data processing system to perform a method comprising:
defining, in a memory coupled to the processor:
an upper tier metric set for multiple outsourcing offerings comprising a first outsourcing offering and a different second outsourcing offering;
a first engagement extended metric set comprising the upper tier metric set and a first engagement extension comprising first outsourcing offering specific metrics specific to the first outsourcing offering, first engagement extended metric set threshold values and first engagement extended metric set calculations for the first outsourcing offering specific metrics; and
a second engagement extended metric set comprising the upper tier metric set and a second engagement extension comprising second outsourcing offering specific metrics specific to the second outsourcing offering, second engagement extended metric set threshold values and second engagement extended metric set calculations for the second outsourcing offering specific metrics;
applying the first engagement extended metric set calculations to engagement operations data to calculate first processed metrics values for first processed metrics;
comparing the first processed metrics values to the first engagement extended metric set threshold value to generate first processed metrics results for the first outsourcing offering;
applying the second engagement extended metric set calculations to the engagement operations data to calculate second processed metrics values for second processed metrics;
comparing the second processed metrics values to the second engagement extended metric set threshold value to generate second processed metrics results for the second outsourcing offering;
establishing an access hierarchy comprising a first access entry authorizing access for a first login to baseline metrics, and a second access entry authorizing access to a first subset of the baseline metrics; and
generating a user interface comprising a metric reporting interface to present the first and second processed metrics results, wherein the metric reporting interface comprises:
a rolled-up summary of the first processed metrics results; or
a rolled-up summary of the second processed metrics results; or
a drill-down link to increasingly detailed reports of the first processed metrics results; or
a drill-down link to increasingly detailed reports of the second processed metrics results; or
any combination thereof.

16. The machine readable medium of claim 15, further comprising collecting at least a portion of the engagement operations data from a remote engagement operations site.

17. The machine readable medium of claim 15, where extending the upper tier metric set with the first engagement extension comprises:
extending the upper tier metric set with the first engagement extension and a first pre-selected middle tier metric set tailored to the first outsourcing offering.

18. The machine readable medium of claim 17, where extending the upper tier metric set with the second engagement extension comprises:
extending the upper tier metric set with the second engagement extension and a second pre-selected middle tier metric set tailored to the second outsourcing offering.

19. The machine readable medium of claim 15, further comprising expanding a rolled-up summary of the first or second processed metrics results to provide increasingly detailed reports of the first or second processed metrics results.

20. A data processing system for reviewing outsourcing operations across multiple engagements and multiple outsourcing offerings, the data processing system comprising:
- a database comprising engagement operations data spanning multiple engagements and multiple outsourcing offerings;
- an upper tier metric set for each of the outsourcing operations comprising upper tier metric set threshold values and upper tier metric set calculations;
- a processor configured to execute a metric processing program comprising processor executable instructions that when executed cause a processor to:
  - apply the upper tier metric set calculations to the engagement operations data to calculate baseline metrics values for baseline metrics;
  - compare the baseline metrics values to the baseline metric set threshold values to generate baseline metrics results across the multiple outsourcing offerings;
- where the processor is further configured to establish an access hierarchy comprising a first access entry authorizing access for a first login to the baseline metrics, and a second access entry authorizing access to a first subset of the baseline metrics;
- where the processor is further configured to generate and display a user interface comprising a metric reporting interface for displaying, according to the access hierarchy, the baseline metrics and the first subset of the baseline metrics,
- where the metric reporting interface comprises:
  - a rolled-up summary of the baseline metrics; or
  - a rolled-up summary of the first subset of the baseline metrics; or
  - a drill-down link to increasingly detailed reports of the baseline metrics; or
  - a drill-down link to increasingly detailed reports of the first subset of the baseline metrics; or
  - any combination thereof.

21. The data processing system of claim 20, further comprising:
- a first middle tier metric set tailored to a first outsourcing offering of the multiple outsourcing offerings;
- a second middle tier metric set tailored to a second outsourcing offering of the multiple outsourcing offerings;
- where the metric processing program causes the processor to apply the first middle tier metric set to the engagement operations data to generate first processed metrics results for the first outsourcing offering and apply the second middle tier metric set to the engagement operations data to generate second processed metrics results for the second outsourcing offering;
- and where the first access entry authorizes access by the first login to the first and second processed metrics results, and denies access by the second login to the first or second processed metrics results.

22. The data processing system of claim 20, further comprising:
- a first engagement extended metric set for a first outsourcing offering of the multiple outsourcing offerings;
- a second engagement extended metric set for a second outsourcing offering of the multiple outsourcing offerings;
- where the metric processing program causes the processor to apply the first engagement extended metric set to the engagement operations data to generate first processed metrics results for the first outsourcing offering and apply the second engagement extended metric set to the engagement operations data to generate second processed metrics results for the second outsourcing offering;
- and where the first access entry authorizes access by the first login to the first and second processed metrics results, and denies access by the second login to the first or second processed metrics results.

23. A machine readable medium encoded with instructions that cause a processor of a data processing system to perform a method comprising:
- defining, in a memory coupled to the processor, an upper tier metric set for multiple outsourcing offerings, the upper tier metric set comprising upper tier metric set threshold values and upper tier metric set calculations;
- applying the upper tier metric set calculations to engagement operations data to calculate baseline metrics values for baseline metrics, the engagement operations data comprising engagement identifiers for multiple outsourcing offerings, respectively, including a first engagement identifier for a first subset of the baseline metrics;
- comparing the baseline metrics values to the baseline metric set threshold values to generate baseline metrics results across the multiple outsourcing offerings;
- querying an access hierarchy comprising a first access entry authorizing access for a first login to the baseline metrics, and when a second access entry matches the first engagement identifier, authorizing access to the first subset of the baseline metrics; and
- generating a user interface comprising a metric reporting interface for displaying, according to the access hierarchy, the baseline metrics and the first subset of the baseline metrics,
- where the metric reporting interface comprises:
  - a rolled-up summary of the baseline metrics; or
  - a rolled-up summary of the first subset of the baseline metrics; or
  - a drill-down link to increasingly detailed reports of the baseline metrics; or
  - a drill-down link to increasingly detailed reports of the first subset of the baseline metrics; or
  - any combination thereof.

24. The machine readable medium of claim 23, where the method further comprises:
- defining a first middle tier metric set tailored to a first outsourcing offering of the multiple outsourcing offerings;
- defining a second middle tier metric set tailored to a second outsourcing offering of the multiple outsourcing offerings;
- applying the first middle tier metric set to the engagement operations data to generate first processed metrics results for the first outsourcing offering;
- applying the second middle tier metric set to the engagement operations data to generate second processed metrics results for the second outsourcing offering;
- and where the first access entry authorizes access by the first login to the first and second processed metrics results, and denies access by the second login to the first or second processed metrics results.

25. The machine readable medium of claim 23, where the method further comprises:
- defining a first engagement extended metric set for a first outsourcing offering of the multiple outsourcing offerings;
- defining a second engagement extended metric set for a second outsourcing offering of the multiple outsourcing offerings;

applying the first engagement extended metric set to the engagement operations data to generate first processed metrics results for the first outsourcing offering;

applying the second engagement extended metric set to the engagement operations data to generate second processed metrics results for the second outsourcing offering;

and where the first access entry authorizes access by the first login to the first and second processed metrics results, and denies access by the second login to the first or second processed metrics results.

* * * * *